(12) United States Patent
Komura et al.

(10) Patent No.: US 8,077,556 B2
(45) Date of Patent: *Dec. 13, 2011

(54) THERMALLY ASSISTED MAGNETIC HEAD, HEAD GIMBAL ASSEMBLY, AND HARD DISK DRIVE

(75) Inventors: Eiji Komura, Tokyo (JP); Koji Shimazawa, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 278 days.

This patent is subject to a terminal disclaimer.

(21) Appl. No.: 12/034,401

(22) Filed: Feb. 20, 2008

(65) Prior Publication Data

US 2008/0205202 A1 Aug. 28, 2008

(30) Foreign Application Priority Data

Feb. 26, 2007 (JP) ................... P2007-046092

(51) Int. Cl.
*G11B 11/24* (2006.01)
(52) U.S. Cl. ............... 369/13.02; 369/13.01; 369/13.14; 369/13.24; 369/13.32; 369/13.33
(58) Field of Classification Search ................ 369/13.02
See application file for complete search history.

(56) References Cited

U.S. PATENT DOCUMENTS

| | | | |
|---|---|---|---|
| 6,016,290 A * | 1/2000 | Chen et al. ................. | 369/13.17 |
| 6,649,894 B2 * | 11/2003 | Matsumoto et al. ....... | 250/201.3 |
| 6,768,556 B1 | 7/2004 | Matsumoto et al. | |
| 6,795,630 B2 * | 9/2004 | Challener et al. ............ | 385/129 |
| 6,873,576 B1 * | 3/2005 | Van Kesteren ............. | 369/13.17 |
| 7,529,158 B2 * | 5/2009 | Matsumoto et al. ....... | 369/13.33 |
| 2003/0066944 A1 | 4/2003 | Matsumoto et al. | |
| 2003/0198146 A1 * | 10/2003 | Rottmayer et al. ........ | 369/13.13 |
| 2004/0081031 A1 | 4/2004 | Saga et al. | |
| 2004/0085862 A1 * | 5/2004 | Matsumoto et al. ....... | 369/13.33 |

(Continued)

FOREIGN PATENT DOCUMENTS

JP A-10-162444 6/1998

(Continued)

OTHER PUBLICATIONS

Matsumoto et al., "Near-Field Optical Probe With a Beaked Metallic Plate for Thermally Assisted Magnetic Recording," MORIS 2006 Workshop Technical Digest, Jun. 6-8, 2006, p. 6-8.

(Continued)

*Primary Examiner* — Joseph Feild
*Assistant Examiner* — Kezhen Shen
(74) *Attorney, Agent, or Firm* — Oliff & Berridge PLC

(57) ABSTRACT

A thermally assisted magnetic head has a medium-facing surface facing a magnetic recording medium; a near-field light generator disposed on a light exit face in the medium-facing surface; a magnetic recording element located adjacent to the near-field light generator; and a light emitting element disposed so that emitted light thereof reaches the near-field light generator; the near-field light generator is comprised of a cusp portion and a base portion; when λin represents a wavelength of the emitted light from the light emitting element immediately before the emitted light reaches the near-field light generator, an intensity of near-field light generated when the material forming the cusp portion is irradiated with the light of the wavelength λin is stronger than an intensity of near-field light generated when the material forming the base portion is irradiated with the light of the wavelength λin.

7 Claims, 23 Drawing Sheets

U.S. PATENT DOCUMENTS

| | | | |
|---|---|---|---|
| 2005/0249451 A1 | 11/2005 | Baehr-Jones et al. | |
| 2007/0096854 A1* | 5/2007 | Matsumoto et al. | 335/208 |
| 2007/0109919 A1* | 5/2007 | Yokoyama et al. | 369/13.24 |
| 2008/0080039 A1* | 4/2008 | Hongo et al. | 359/237 |
| 2008/0191122 A1* | 8/2008 | Hongo et al. | 250/201.5 |

FOREIGN PATENT DOCUMENTS

| | | |
|---|---|---|
| JP | A-2000-173093 | 6/2000 |
| JP | A-2001-255254 | 9/2001 |
| JP | A-2001-283404 | 10/2001 |
| JP | A-2001-325756 | 11/2001 |
| JP | A-2002-298302 | 10/2002 |
| JP | A-2003-114184 | 4/2003 |
| JP | A-2004-158067 | 6/2004 |
| JP | A-2004-303299 | 10/2004 |
| JP | A-2005-4901 | 1/2005 |
| JP | A-2006-185548 | 7/2006 |
| JP | A-2007-164935 | 6/2007 |
| JP | A-2008-111845 | 5/2008 |
| WO | WO 92/02931 A1 | 2/1992 |
| WO | WO 98/09284 | 3/1998 |
| WO | WO 99/53482 A1 | 10/1999 |

OTHER PUBLICATIONS

Miyanishi et al., "Near-Field Assisted Magnetic Recording," IEEE Transactions on Magnetics, vol. 41, No. 10, Oct. 2005, p. 2817-2821.

Shono et al., "Review of Thermally Assisted Magnetic Recording," Journal of Japanese Applied Magnetics, vol. 29, No. 1, 2005, p. 5-13 and English translation of p. 11-12.

Hochberg, et al., "Integrated Plasmon and Dielectric Waveguides," Nov. 1, 2004, Optics Express vol. 12, No. 22, pp. 5481-5486.

* cited by examiner

WAVELENGTH OF INCIDENT LIGHT:560nm

WAVELENGTH OF INCIDENT LIGHT:560nm

WAVELENGTH OF INCIDENT LIGHT:560nm

WAVELENGTH OF INCIDENT LIGHT:560nm

THERMALLY ASSISTED MAGNETIC HEAD, HEAD GIMBAL ASSEMBLY, AND HARD DISK DRIVE

BACKGROUND OF THE INVENTION

1. Field of the Invention

The present invention relates to a thermally assisted magnetic head for writing of signals by thermally assisted magnetic recording and to a head gimbal assembly (HGA) with this thermally assisted magnetic head, and a hard disk drive with this HGA.

2. Related Background Art

As the recording density of the hard disk drive increases, further improvement is demanded in the performance of the thin film magnetic head. The thin film magnetic head commonly used is a composite type thin film magnetic head of a structure in which a magnetic detecting element such as a magneto-resistive (MR) effect element and a magnetic recording element such as an electromagnetic coil element are stacked, and these elements are used to read and write data signals from and into a magnetic disk as a magnetic recording medium.

In general, the magnetic recording medium is a kind of a discontinuous body of fine magnetic particles aggregated, and each of the fine magnetic particles is made in a single magnetic domain structure. A recording bit is composed of a plurality of fine magnetic particles. Therefore, in order to increase the recording density, it is necessary to decrease the size of the fine magnetic particles and thereby decrease unevenness at borders of recording bits. However, the decrease in the size of the fine magnetic particles raises the problem of degradation of thermostability of magnetization due to decrease of volume.

A measure of the thermostability of magnetization is given by $K_U V/k_B T$. In this case, $K_U$ represents the magnetic anisotropy energy of the fine magnetic particles, V the volume of one magnetic particle, $k_B$ the Boltzmann constant, and T absolute temperature. The decrease in the size of fine magnetic particles is nothing but decrease in V, and, without any countermeasures, the decrease in V will lead to decrease of $K_U V/k_B T$ and degradation of the thermostability. A conceivable countermeasure to this problem is to increase $K_U$ at the same time, but this increase of $K_U$ will lead to increase in the coercive force of the recording medium. In contrast to it, the intensity of the writing magnetic field by the magnetic head is virtually determined by the saturation magnetic flux density of a soft magnetic material making the magnetic poles in the head. Therefore, the writing becomes infeasible if the coercive force exceeds a tolerance determined from this limit of writing magnetic field intensity.

As a method of solving this problem of thermostability of magnetization there is the following proposal of so-called thermally assisted magnetic recording: while a magnetic material with large $K_U$ is used, heat is applied to the recording medium immediately before application of the writing magnetic field, to decrease the coercive force, and writing is performed in that state. This recording is generally classified under magnetic dominant recording and optical dominant recording. In the magnetic dominant recording, the dominant of writing is an electromagnetic coil element and the radiation diameter of light is larger than the track width (recording width). On the other hand, in the optical dominant recording, the dominant of writing is a light radiating portion and the radiation diameter of light is approximately equal to the track width (recording width). Namely, the magnetic field determines the spatial resolution in the magnetic dominant recording, whereas the light determines the spatial resolution in the optical dominant recording.

As examples of such thermally-assisted magnetic head recording apparatus, Patent Documents (Japanese Patent Application Laid-Open No. 2001-255254, Japanese Patent Application Laid-Open No. 2003-114184) and Non-patent Document (T. Matsumoto et al., Near-Field Optical Probe with A Beaked Metallic Plate for Thermally Assisted Magnetic Recording, pp. 6-7, MORIS2006 WORKSHOP Technical Digest, Jun. 6-8, 2003) disclose the thermally-assisted magnetic heads in which an electroconductive near-field light generator of a plate shape is disposed on a medium-facing surface and in which light is guided onto the near-field light generator from the opposite side to the medium side to generate near-field light. A pointed cusp portion is formed at an end of the near-field light generator and the near-field light is emitted mainly from this cusp portion.

SUMMARY OF THE INVENTION

In the thermally assisted magnetic heads described in the above-cited Documents, however the near-field light is also radiated from the part other than the tip of the near-field light generator, particularly, from the base end opposite to the tip. When the near-field light is also radiated from the part other than the tip in this manner, it can be difficult to intensively heat only a desired point. Furthermore, when the near-field light is also radiated from the part other than the tip as described above, the near-field light impinges not only on a track where writing is implemented in the recording medium, but also on a track adjacent thereto, during thermally assisted magnetic recording. Since this also decreases the coercive force of the track part adjacent to the track where writing is implemented in the recording medium, there could arise the problem of so-called "side erase" which is writing or erasure on the adjacent track.

The present invention has been accomplished in view of this problem and an object of the invention is to provide a thermally assisted magnetic head with a near-field light generator in which emission of near-field light from the part other than the tip is well suppressed, an HGA provided with this thermally assisted magnetic head, and a hard disk drive provided with this HGA.

A thermally assisted magnetic head according to the present invention is a thermally assisted magnetic head comprising: a medium-facing surface facing a magnetic recording medium; a near-field light generator provided on a light exit face in the medium-facing surface; a magnetic recording element located adjacent to the near-field light generator; and a light emitting element provided so that emitted light thereof reaches the near-field light generator; wherein the near-field light generator is comprised of a cusp portion and a base portion; and wherein when λin is a wavelength of the emitted light from the light emitting element immediately before the emitted light reaches the near-field light generator, an intensity of near-field light generated when a material forming the cusp portion is irradiated with the light of the wavelength λin is larger than an intensity of near-field light generated when a material forming the base portion is irradiated with the light of the wavelength λin.

According to the present invention, the emitted light from the light emitting element reaches the near-field light generator and thus the near-field light is generated from the near-field light generator. Since the near-field light generator is located adjacent to the magnetic recording element in the medium-facing surface, the temperature increases in a recording region of the magnetic recording medium facing the medium-facing surface, to temporarily lower the coercive force of the recording region. The magnetic recording element is energized during this period of the lowered coercive force to generate a writing magnetic field, whereby information can be written in the recording region.

Besides, the present invention adequately suppresses emission of near-field light from the part other than the tip of the cusp portion of the near-field light generator. Namely, the materials forming the cusp portion and the base portion are selected so that, when the near-field light generator is irradiated with the light emitted from the light emitting element, the intensity of the near-field light emitted from the cusp portion of the near-field light generator becomes stronger and the intensity of the near-field light emitted from the base portion of the near-field light generator becomes weaker than in the case where the entire near-field light generator is made of one kind of material. This adequately suppresses emission of the near-field light from the part other than the tip of the cusp portion of the near-field light generator.

Furthermore, preferably, the magnetic head portion further has a core of a planar waveguide including the light exit face where the near-field light generator is formed, and the emitted light from the light emitting element is incident to a light entrance face of the planar waveguide. In this configuration, the emitted light from the light emitting element is made incident to the light entrance face of the planar waveguide, whereby the emitted light from the light emitting element can be readily guided to the near-field light generator.

Preferably, the cusp portion of the near-field light generator is closer to the magnetic recording element than the base portion of the near-field light generator. This configuration can shorten a time from increase in the temperature of a recording region by irradiation of the recording region of the magnetic recording medium with the near-field light, to application of a writing magnetic field to this region. As a result, it becomes easy to apply the writing magnetic field to this region during the period in which the coercive force of the recording region is adequately lowered.

Preferably, an area of a planar shape of the cusp portion of the near-field light generator as viewed from the medium-facing surface side is smaller than an area of a planar shape of the base portion of the near-field light generator as viewed from the medium-facing surface side. This can sufficiently increase the volume of the base portion of the near-field light generator, whereby emission of the near-field light is adequately suppressed from the part other than the tip of the cusp portion.

Preferably, a planar shape of the base portion of the near-field light generator as viewed from the medium-facing surface side has a corner comprised of a curve. This configuration eliminates a pointed portion likely to generate near-field light, or decreases the number of pointed portions, from the base portion of the near-field light generator. As a result, emission of the near-field light is more suppressed from the part other than the tip of the cusp portion of the near-field light generator.

Preferably, in a planar shape of the near-field light generator as viewed from the medium-facing surface side, a side of the cusp portion in contact with one end of a border line between the cusp portion and the base portion, and a side of the base portion in contact with the one end of the border line are linearly continuous without any level difference, and a side of the cusp portion in contact with the other end of the border line, and a side of the base portion in contact with the other end of the border line are linearly continuous without any level difference.

This eliminates pointed portions likely to generate the near-field light, or decreases the number of pointed portions, from the part other than the tip of the cusp portion of the near-field light generator. As a result, emission of the near-field light is more suppressed from the part other than the tip of the cusp portion of the near-field light generator.

Preferably, a combination (a, b) of the material (a) forming the cusp portion of the near-field light generator with the material (b) forming the base portion of the near-field light generator is one selected from the group consisting of the following combinations: (Ag, Al), (Au, Al), (Au, Ru), (Au, Pt), (AuCu, Pt), (AuCu, In), (AuCu, Al), (AuCu, Pd), (Au, Pd), (Au, In), (Au, Rh), (AuCu, Rh), (Ag, In), (Ag, Rh), (Ag, Ru), (Ag, Pt), (Al, Rh), (Al, Ru), and (Al, Pt).

An HGA according to the present invention is preferably one comprising the above-described thermally assisted magnetic head, and a suspension supporting the thermally assisted magnetic head, and a hard disk drive according to the present invention is preferably one comprising the above-described HGA, and the magnetic recording medium facing the medium-facing surface.

Since the hard disk drive with the HGA is able to intensively heat the recording region of the magnetic recording medium, occurrence of writing failure due to insufficient heating can be adequately decreased. Since the heating on the track adjacent to the recording region is fully suppressed, occurrence of "side erase" can be well suppressed.

Since the present invention enables the suppression of emission of near-field light from the part other than the cusp portion of the near-field light generator, a desired portion of the medium can be selectively heated, whereby high-density recording can be readily implemented by thermally assisted magnetic recording.

DESCRIPTION OF THE PREFERRED EMBODIMENTS

Figure 1:
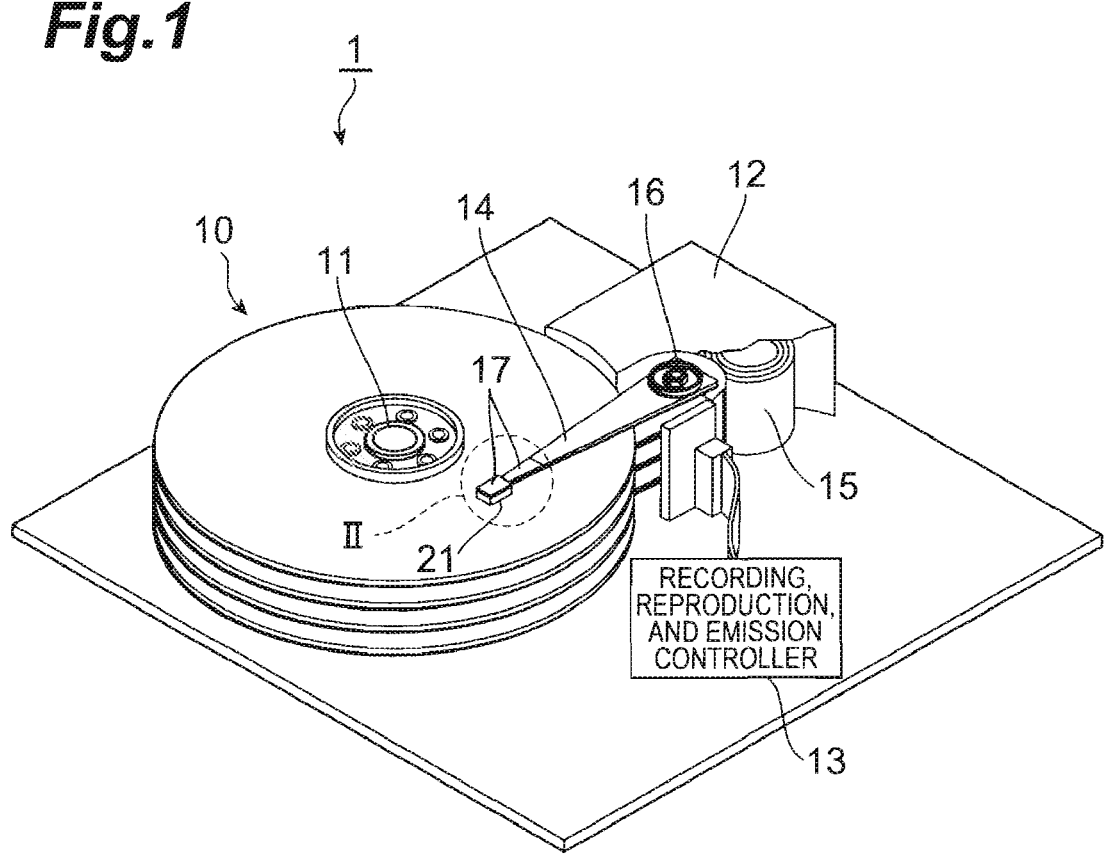
FIG. 1 is a perspective view of a hard disk drive according to an embodiment.

Embodiments for carrying out the present invention will be described below in detail with reference to the accompanying drawings. In each of the drawings, the same elements will be denoted by the same reference numerals. It is also noted that the dimensional ratios in and between the constituent elements in the drawings are arbitrary, for easier understanding of the drawings.

(Hard Disk Drive)

FIG. 1 is a perspective view of a hard disk drive according to an embodiment.

The hard disk drive 1 has magnetic disks 10 consisting of a plurality of magnetic recording media to rotate around a rotation shaft of spindle motor 11, an assembly carriage device 12 for positioning each thermally assisted magnetic head 21 on a track, and a recording, reproduction, and emission controller (control circuit) 13 for controlling writing and reading operations of each thermally assisted magnetic head 21 and for controlling a laser diode as a light source for emitting laser light for thermally assisted magnetic recording, which will be detailed later.

The assembly carriage device 12 is provided with a plurality of drive arms 14. These drive arms 14 are rockable around a pivot bearing shaft 16 by voice coil motor (VCM) 15, and are stacked in the direction along this shaft 16. A head gimbal assembly (HGA) 17 is attached to the distal end of each drive arm 14. Each HGA 17 is provided with a thermally assisted magnetic head 21 so that it faces the surface of each magnetic disk 10. The surface of the magnetic head 21 facing the surface of the magnetic disk 10 is a medium-facing surface S (which is also called an air bearing surface) of the thermally assisted magnetic head 21. The number of each of magnetic disks 10, drive arms 14, HGAs 17, and thermally assisted magnetic heads 21 may be one.

(HGA)

Figure 2:
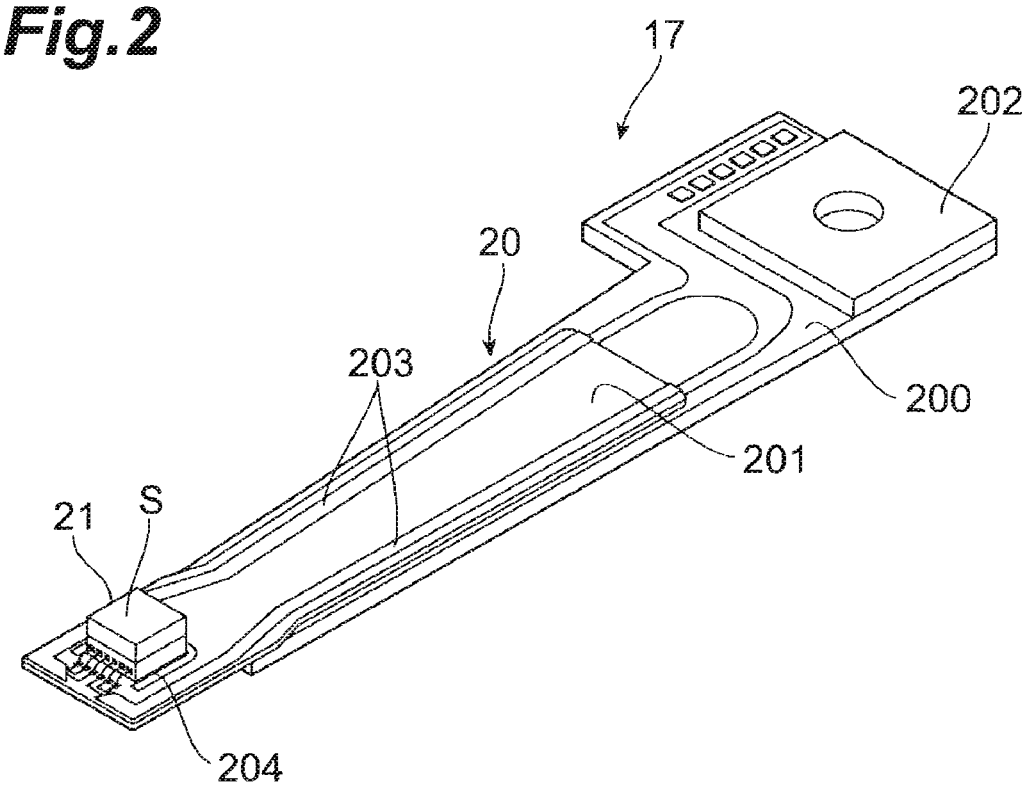
FIG. 2 is a perspective view of an HGA 17.

FIG. 2 is a perspective view of an HGA 17. In the same drawing the medium-facing surface S of HGA 17 is illustrated up.

The HGA 17 is constructed by fixing the thermally assisted magnetic head 21 to a distal end of suspension 20 and electrically connecting one end of wiring member 203 to terminal electrodes of the thermally assisted magnetic head 21. The suspension 20 is composed mainly of a load beam 200, a flexure 201 with elasticity fixed and supported on this load beam 200, a tongue portion 204 formed in a plate spring shape at the tip of the flexure, a base plate 202 disposed on the base part of the load beam 200, and a wiring member 203 disposed on the flexure 201 and consisting of a lead conductor and connection pads electrically connected to the both ends of the lead conductor.

It is obvious that the structure of the suspension in the HGA 17 is not limited to the above-described structure. An IC chip for driving of the head may be mounted midway in the suspension 20, though not shown.

(Thermally Assisted Magnetic Head)

Figure 3:
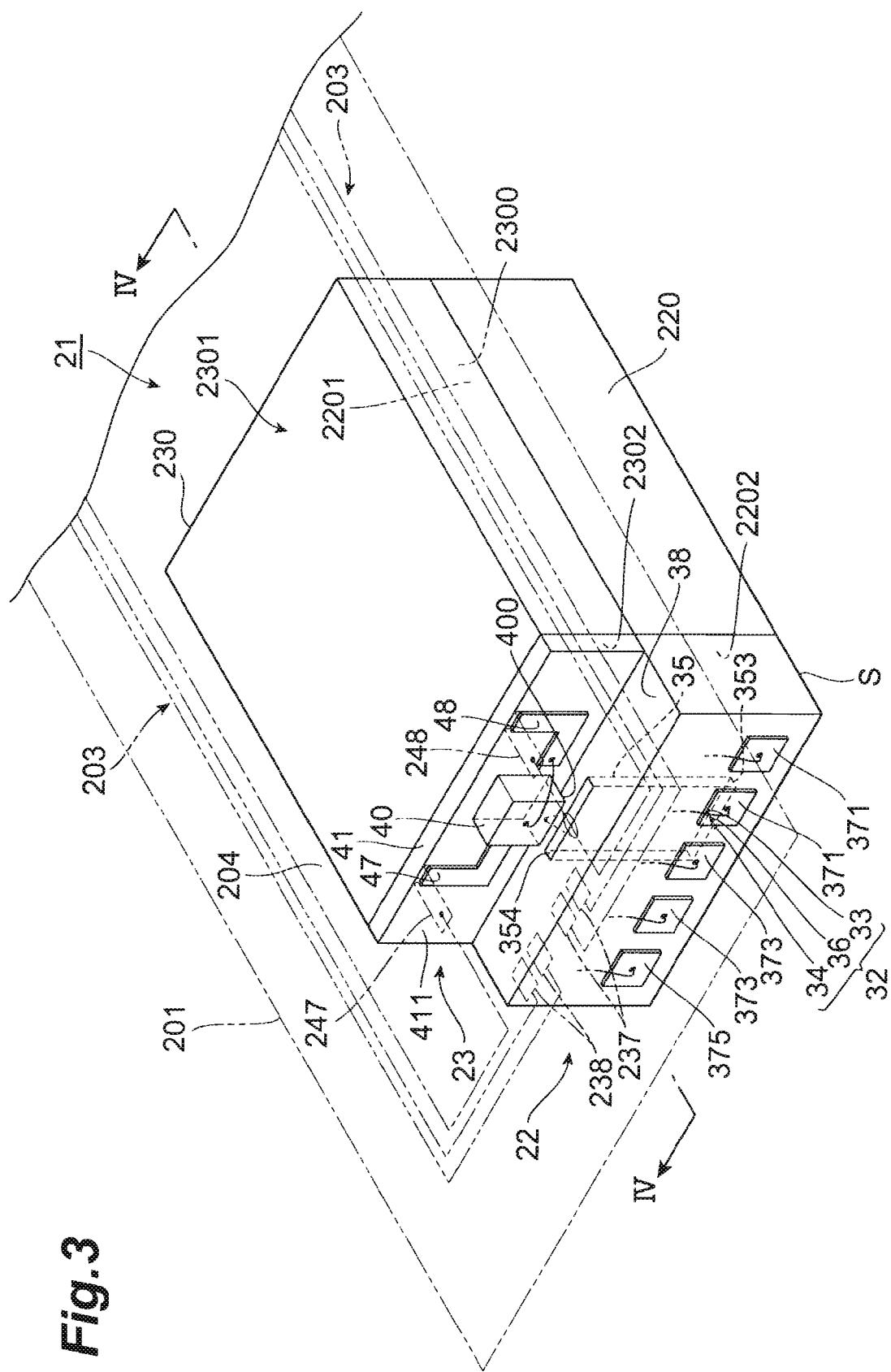
FIG. 3 is an enlarged perspective view of a part near a thermally assisted magnetic head 21 shown in FIG. 1.

FIG. 3 is an enlarged perspective view of a part near the thermally assisted magnetic head 21 shown in FIG. 1.

The wiring member 203 has a pair of electrode pads 237, 237 for recording signal, a pair of electrode pads 238, 238 for readout signal, and a pair of electrode pads 247, 248 for driving of the light source.

The thermally assisted magnetic head 21 has a configuration in which a slider 22, and a light source unit 23 having a light source support substrate 230 and a laser diode (light emitting element) 40 as a light source for thermally assisted magnetic recording are bonded and fixed to each other so that a back surface (first surface) 2201 of a slider substrate 220 is in contact with a bond surface (second surface) 2300 of the light source support substrate 230. The back surface 2201 of the slider substrate 220 herein is a surface opposite to the medium-facing surface S of the slider 22. A bottom surface 2301 of the light source support substrate 230 is bonded to the tongue portion 204 of the flexure 201, for example, with an adhesive such as epoxy resin.

The slider 22 has a slider substrate 220, and a magnetic head portion 32 for performing writing and reading of data signal.

The slider substrate 220 is of a plate shape and has the medium-facing surface S processed so as to achieve an appropriate levitation amount. The slider substrate 220 is made of electrically conductive AlTiC ($Al_2O_3$—TiC) or the like.

The magnetic head portion 32 is formed on an integration surface 2202 which is a side surface approximately perpendicular to the medium-facing surface S of the slider substrate 220. The magnetic head portion 32 has an MR effect element 33 as a magnetic detecting element for detecting magnetic information, an electromagnetic coil element 34 as a perpendicular (or, possibly, longitudinal) magnetic recording element for writing magnetic information by generation of a magnetic field, a waveguide (core) 35 as a planar waveguide provided through between the MR effect element 33 and the electromagnetic coil element 34, a near-field light generator plasmon probe) 36 for generating near-field light for heating a recording layer portion of a magnetic disk, and an insulating layer (cladding) 38 formed on the integration surface 2202 so as to cover these MR effect element 33, electromagnetic coil element 34, core 35, and near-field light generator 36.

Furthermore, the magnetic head portion 32 has a pair of electrode pads 371, 371 for signal terminals formed on an exposed surface of the insulating layer 38 and connected respectively to input and output terminals of the MR effect element 33, a pair of electrode pads 373, 373 for signal terminals connected respectively to the two ends of the electromagnetic coil element 34, and an electrode pad 375 for ground electrically connected to the slider substrate 220. The electrode pad 375 electrically connected through a via hole 375a to the slider substrate 220 is connected through a bonding wire to the electrode pad 247 of the flexure 201 and a potential of the slider substrate 220 is controlled, for example, to the ground potential by the electrode pad 247.

Each of the end faces of the MR effect element 33, electromagnetic coil element 34, and near-field light generator 36 is exposed on the medium-facing surface S. The two ends of the laser diode 40 are connected to the electrode pads 47, 48, respectively.

Figure 4:
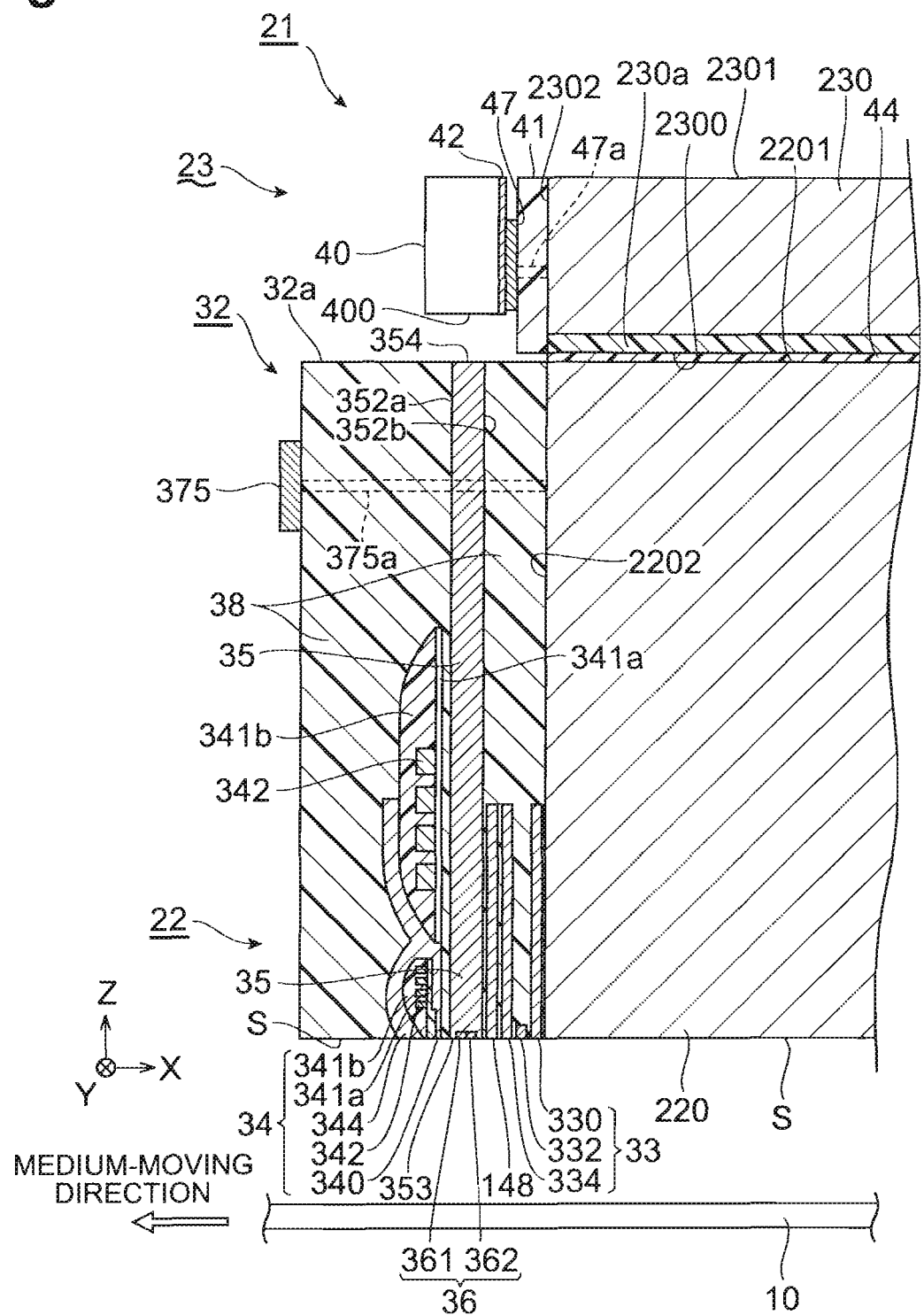
FIG. 4 is a sectional view of the thermally assisted magnetic head 21 shown in FIG. 3, taken along line IV-IV and in the direction of arrows.

FIG. 4 is a sectional view of the thermally assisted magnetic head 21 shown in FIG. 3, taken along line IV-IV and in the direction of arrows.

The MR effect element 33 includes an MR laminate 332, and a lower shield layer 330 and an upper shield layer 334 located at respective positions on both sides of this MR laminate 332. The lower shield layer 330 and the upper shield layer 334 can be made, for example, of a magnetic material of NiFe, CoFeNi, CoFe, FeN, FeZrN, or the like and in the thickness of about 0.5-3 μm by a pattern plating method including a frame plating method, or the like. The upper and lower shield layers 334 and 330 prevent the MR laminate 332 from being affected by an external magnetic field serving as noise.

The MR laminate 332 includes a magneto-resistance effect film such as an in-plane conduction type (CIP (Current In Plane)) Giant Magneto Resistance (GMR) multilayer film, a perpendicular conduction type (CPP (Current Perpendicular to Plane)) GMR multilayer film, or a Tunnel Magneto Resistance (TMR) multilayer film, and is sensitive to a signal magnetic field from the magnetic disk with very high sensitivity.

For example, when the MR laminate 332 includes a TMR effect multilayer film, it has a structure in which the following layers are stacked in order: an antiferromagnetic layer made of IrMn, PtMn, NiMn, RuRhMn, or the like and in the thickness of about 5-15 nm; a magnetization fixed layer comprised, for example, of CoFe or the like as a ferromagnetic material, or two layers of CoFe or the like with a nonmagnetic metal layer of Ru or the like in between, and having the magnetization direction fixed by the antiferromagnetic layer; a tunnel barrier layer of a nonmagnetic dielectric material made, for example, by oxidizing a metal film of Al, AlCu, or the like about 0.5-1 nm thick by oxygen introduced into a vacuum chamber, or by natural oxidation; and a magnetization free layer comprised, for example, of two layered films of CoFe or the like about 1 nm thick as a ferromagnetic material and NiFe or the like about 3-4 nm thick, and effecting tunnel exchange coupling through the tunnel barrier layer with the magnetization fixed layer.

An interelement shield layer 148 made of the same material as the lower shield layer 330 is formed between the MR effect element 33 and the core 35. The interelement shield layer 148 performs a function of shielding the MR effect element 33 from a magnetic field generated by the electromagnetic coil element 34 and preventing external noise during readout. A backing coil portion may also be further formed between the interelement shield layer 148 and the core 35. The backing coil portion generates a magnetic flux to cancel a magnetic flux loop generated by the electromagnetic coil element 34 and passing via the upper and lower electrode layers of the MR effect element 33, and thereby suppresses the Wide Area Track Erasure (WATE) phenomenon being an unwanted writing or erasing operation on the magnetic disk.

The insulating layer 38 made of alumina or the like is formed between the shield layers 330, 334 on the opposite side to the medium-facing surface S of the MR laminate 332, on the opposite side to the medium-facing surface S of the shield layers 330, 334, 148, between the lower shield layer 330 and the slider substrate 220, and between the interelement shield layer 148 and the core 35.

When the MR laminate 332 includes a CIP-GMR multilayer film, upper and lower shield gap layers for insulation of alumina or the like are provided between each of the upper and lower shield layers 334 and 330, and the MR laminate 332. Furthermore, an MR lead conductor layer for supplying a sense current to the MR laminate 332 to extract reproduction output is formed though not shown. On the other hand, when the MR laminate 332 includes a CPP-GMR multilayer film or a TMR multilayer film, the upper and lower shield layers 334 and 330 also function as upper and lower electrode layers, respectively. In this case, the upper and lower shield gap layers and MR lead conductor layer are unnecessary and omitted.

A hard bias layer HM (cf. FIG. 7) of a ferromagnetic material such as CoTa, CoCrPt, or CoPt, for applying a vertical bias magnetic field for stabilization of magnetic domains, is formed on each of both sides in the track width direction of the MR laminate 332.

The electromagnetic coil element 34 is preferably one for perpendicular magnetic recording and, as shown in FIG. 4, has a main magnetic pole layer 340, a gap layer 341a, a coil insulating layer 341b, a coil layer 342, and an auxiliary magnetic pole layer 344.

The main magnetic pole layer 340 is a magnetic guide for guiding a magnetic flux induced by the coil layer 342, up to the recording layer of the magnetic disk (medium) as a target of writing, while converging the magnetic flux. The end of the main magnetic pole layer 340 on the medium-facing surface S side preferably has a width in the track width direction (depth direction in FIG. 4) and a thickness in the stack direction (horizontal direction in FIG. 4) smaller than those of the other portions. This results in permitting the main magnetic pole layer to generate a fine and strong writing magnetic field adapted for high recording density.

The end portion of the auxiliary magnetic pole layer 344 on the medium-facing surface S side, which is magnetically coupled with the main magnetic pole layer 340, forms a trailing shield portion wider in a layer section than the other portion of the auxiliary magnetic pole layer 344. The auxiliary magnetic pole layer 344 is opposed through the gap layer (cladding) 341a and coil insulating layer 341b made of an insulating material such as alumina, to the end of the main magnetic pole layer 340 on the medium-facing surface S side. When the auxiliary magnetic pole layer 344 of this configuration is provided, the magnetic field gradient becomes steeper between the auxiliary magnetic pole layer 344 and the main magnetic pole layer 340 near the medium-facing surface S. This results in decreasing jitter of signal output and permitting decrease in the error rate during readout.

The auxiliary magnetic pole layer 344 is made, for example, in the thickness of about 0.5 to about 5 μm and, for example, of an alloy of two or three out of Ni, Fe, and Co or an alloy containing these as principal ingredients and doped with a predetermined element by frame plating, sputtering, or the like.

The gap layer 341a separates the coil layer 342 from the main magnetic pole layer 340 and is made, for example, in the thickness of about 0.01 to about 0.5 μm and, for example, of $Al_2O_3$ or DLC or the like by sputtering, CVD, or the like.

The coil layer 342 is made, for example, in the thickness of about 0.5 to about 3 μm and, for example, of Cu or the like by frame plating or the like. The rear end of the main magnetic pole layer 340 is coupled with the portion of the auxiliary magnetic pole layer 344 apart from the medium-facing surface S and the coil layer 342 is formed so as to surround this coupling portion.

The coil insulating layer 341b separates the coil layer 342 from the auxiliary magnetic pole layer 344 and is made, for example, in the thickness of about 0.1 to about 5 μm and of an electric insulating material such as thermally cured alumina or resist layer or the like.

Figure 5:
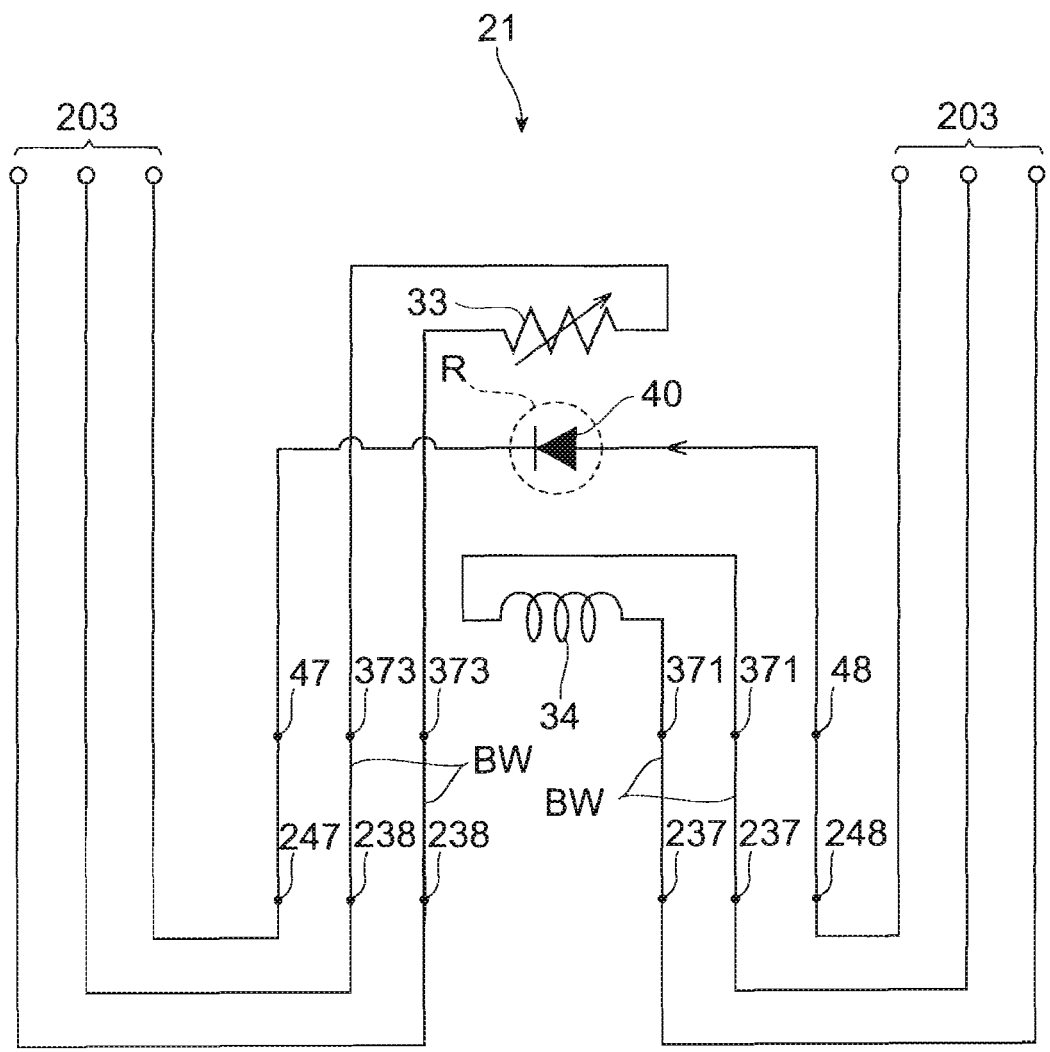
FIG. 5 is a circuit diagram of the thermally assisted magnetic head 21.

FIG. 5 is a circuit diagram of the thermally assisted magnetic head 21.

One of wires forming the wiring member 203 is electrically connected through the electrode pad 247 and electrode pad 47 to the cathode of the laser diode 40, and another wire is electrically connected through the electrode pad 248 and electrode pad 48 to the anode of the laser diode 40. The laser diode 40 emits light with supply of a drive current between the electrode pads 247, 248. This light travels through the core 35 of the planar waveguide and the medium-facing surface S (cf. FIG. 4) to irradiate a recording region R of the magnetic recording medium.

Another pair of wires forming the wiring member 203 are connected through the electrode pads 237, bonding wires BW, and electrode pads 371 to the two ends of the electromagnetic coil element 34. When a voltage is applied between the pair of electrode pads 237, an electric current is fed to the electromagnetic coil element 34 as a magnetic recording element to generate a writing magnetic field. In the thermally assisted magnetic head 21, the light emitted from the laser diode 40 is incident to a light entrance face 354 of the core 35 of the planar waveguide and emerges from a light exit face thereof provided in the medium-facing surface S to irradiate the recording region R of the magnetic recording medium (cf. FIG. 4). Therefore, the temperature rises in the recording region R of the magnetic recording medium facing the medium-facing surface, to temporarily lower the coercive force of the recording region R. Information can be written in the recording region R when the electromagnetic coil element 34 is energized during this period of the lowered coercive force.

Another pair of wires forming the wiring member 203 are connected through the electrode pads 238, bonding wires BW, and electrode pads 373 to the two ends of the MR effect element 33, respectively. When a voltage is applied between the pair of electrode pads 238, a sense current flows to the MR effect element 33. Information written in the recording region R can be read out with flow of the sense current to the MR effect element 33.

Figure 6:
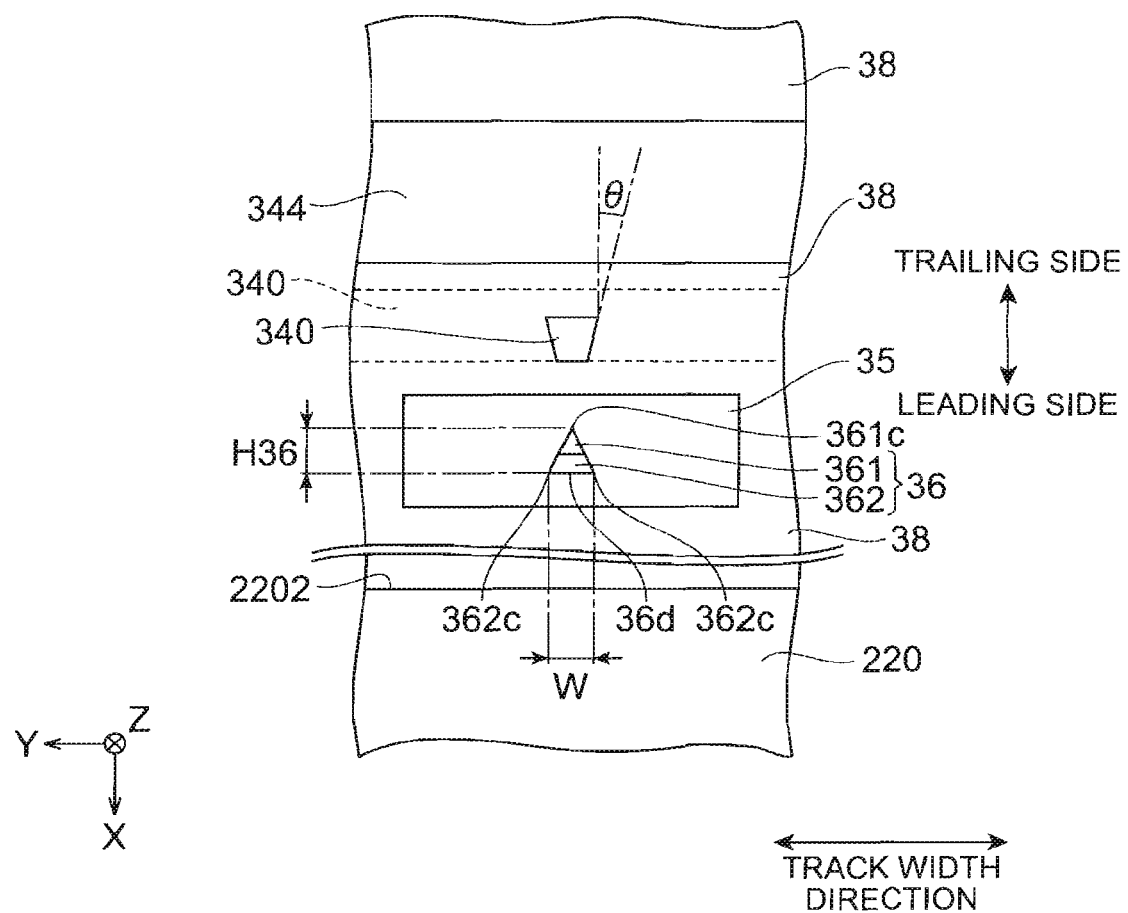
FIG. 6 is a plan view of a major part of the magnetic head as seen from the medium-facing surface side.

FIG. 6 is a plan view of a major part of the magnetic head as seen from the medium-facing surface side.

The tip of the main magnetic pole layer 340 on the medium-facing surface S side is tapered in a shape of such an inverted trapezoid that the length of the side on the leading side or slider substrate 220 side is shorter than the length of the side on the trailing side.

The end face of the main magnetic pole layer 340 on the medium-facing surface side is provided with a bevel angle θ, in order to avoid unwanted writing or the like on an adjacent track by influence of a skew angle made by actuation with a rotary actuator. The magnitude of the bevel angle θ is, for example, approximately 15°. In practice, the writing magnetic field is generated mainly near the longer side on the trailing side and in the case of the magnetic dominant recording, the length of this longer side determines the width of the writing track.

Here the main magnetic pole layer 340 is preferably made, for example, in the total thickness of about 0.01 to about 0.5 μm at the end portion on the medium-facing surface S side and in the total thickness of about 0.5 to about 3.0 μm at the portions other than this end portion and, for example, of an alloy of two or three out of Ni, Fe, and Co or an alloy containing the foregoing elements as main ingredients and doped with a predetermined element by frame plating, sputtering, or the like. The track width can be, for example, 100 nm.

Figure 7:
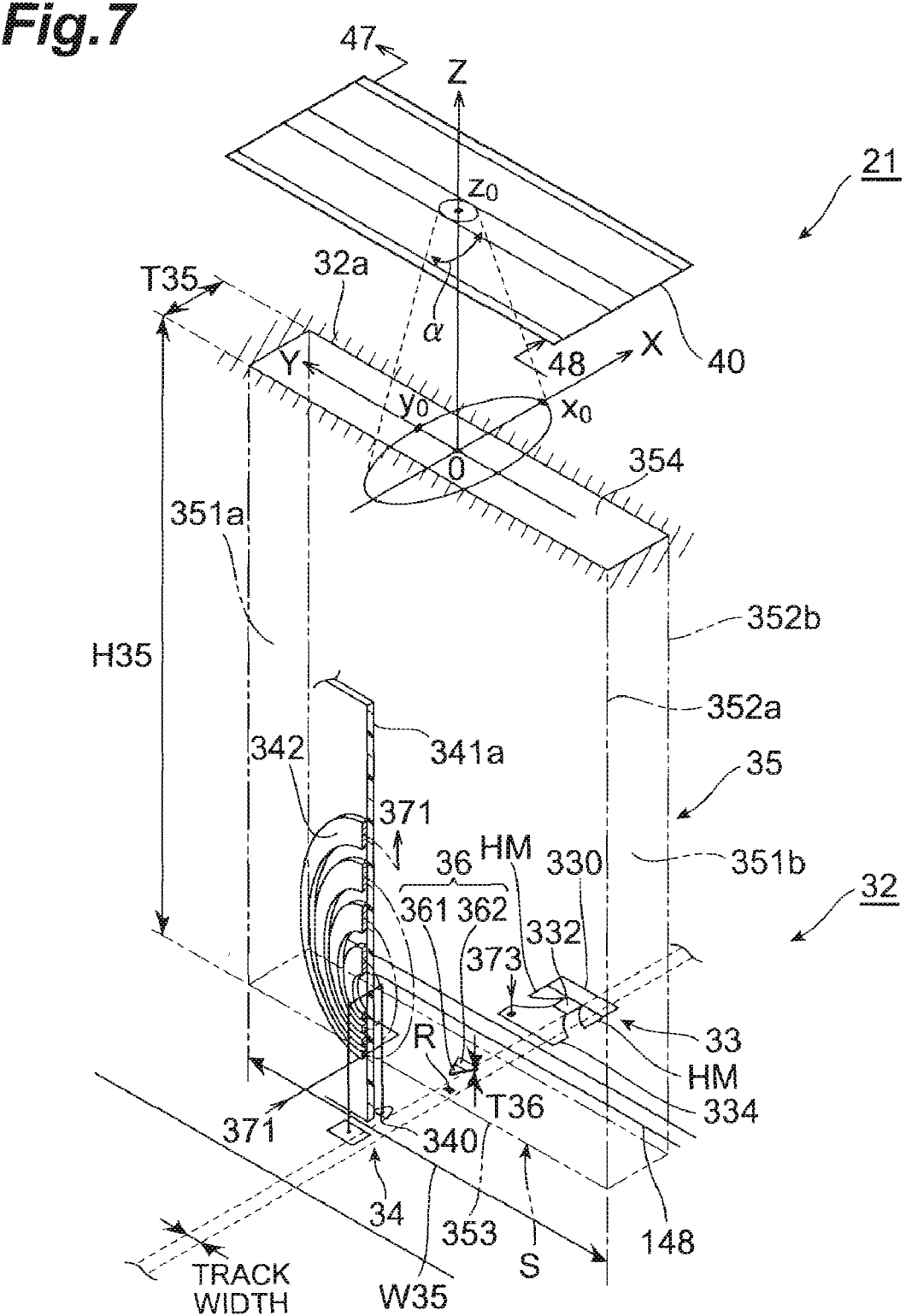
FIG. 7 is a perspective view of a major part of the thermally assisted magnetic head 21.

FIG. 7 is a perspective view of a major part of the thermally assisted magnetic head 21.

When the X-axis is set along the thickness direction of the core 35, the Y-axis along the width direction, and the Z-axis along the longitudinal direction, the light emitted along the Z-axis from the light emitting surface of the laser diode 40 is incident to the light entrance face 354.

The core 35 is located between the MR effect element 33 and the electromagnetic coil element 34, extends in parallel with the integration surface (YZ plane) 2202 (cf. FIG. 4), extends from the medium-facing surface S of the magnetic head portion 32 to the surface 32a opposite to the medium-facing surface S of the magnetic head portion 32, and is of a rectangular plate shape in the present example. The core 35 has two side faces 351a, 351b both extending from the medium-facing surface S and opposed in the track width direction, and two upper face 352a and lower face 352b parallel to the integration surface 2202, and the core 35 also has a light exit face 353 forming the medium-facing surface S, and a light entrance face 354 opposite to the light exit face 353. The upper face 352a, the lower face 352b, and the two side faces 351a, 351b of the core 35 are in contact with the insulating layer 38 (cf. FIG. 4) having the refractive index smaller than that of the core 35 and functioning as a cladding for the core 35.

The core 35 is able to guide light incident through the light entrance face 354, to the light exit face 353 as the end face on the medium-facing surface S side, while reflecting the light on the two side faces 351a, 351b, the upper face 352a, and the lower face 352b. The width W35 of the core 35 in the track width direction can be, for example, 1-200 μm, the thickness T35, for example, 2-10 μm, and the height H35 10-300 μm.

The core 35 is made, for example, by sputtering or the like, from a dielectric material which has the refractive index n higher than that of the material making the insulating layer 38, everywhere. For example, in a case where the insulating layer 38 as a cladding is made of $SiO_2$ (n=1.5), the core 35 may be made of $Al_2O_3$ (n=1.63). Furthermore, in a case where the insulating layer 38 is made of $Al_2O_3$ (n=1.63), the core 35 may be made of $Ta_2O_5$ (n=2.16), $Nb_2O_5$ (n=2.33), TiO (n=2.3-2.55), or $TiO_2$ (n=2.3-2.55). When the core 35 is made of one of such materials, the total reflection condition is met at the interface, in addition to the good optical characteristics of the material itself, so as to decrease the propagation loss of laser light and increase the efficiency of generation of near-field light.

The near-field light generator 36 is a platelike member disposed nearly in the center of the light exit face 353 of the core 35. The near-field light generator 36 is buried in the light exit face 353 of the core 35 so that the end face thereof is exposed in the medium-facing surface S. When the near-field light generator 36 is irradiated with the light from the laser diode 40, it generates the near-field light. When the near-field light generator 36 is irradiated with the light, electrons in the metal making the near-field light generator 36 come to oscillate in a plasma (plasma oscillation) to cause concentration of the electric field at the distal end. Since a spread of this near-field light is approximately equal to the radius of the distal end of the plasmon probe, we can enjoy a pseudo effect of narrowing down the emitted light to below the diffraction limit if the radius of the distal end is set to below the track width. The near-field light generator 36 consists of a cusp portion 361 forming a part on the magnetic recording element 34 side and a base portion 362 forming a part on the side opposite to the magnetic recording element 34 side and the near-field light is intensively generated from the tip of the cusp portion of the near-field light generator 36 (which will be detailed later).

The main magnetic pole layer 340 extends from the helical center of the coil layer 342 toward the medium-facing surface S. When an electric current is fed to the coil layer 342, a magnetic field is guided through the main magnetic pole layer 340 to the medium-facing surface S to generate the writing magnetic field spreading outwardly from the medium-facing surface S.

The thermally assisted magnetic head 21 described above has the slider substrate 220 having the medium-facing surface S, the first surface 2201 located on the opposite side to the medium-facing surface S, and the side surfaces located between the medium-facing surface and the first surface 2201; the core 35 of the planar waveguide having the light exit face 353 on the medium-facing surface S side; the magnetic head portion 32 having the magnetic recording element 34 in proximity to the light exit face 353 and fixed to one of the side surfaces of the slider substrate 220; the light source support substrate 230 having the second surface 2300 fixed to the first surface 2201; and the light emitting element 40 facing the light entrance face 354 of the core 35 and fixed to the light source support substrate 230 (cf. FIG. 4). The term "proximity" refers to a distance defined as follows: before a recording region R of the magnetic recording medium heated by the light exit face 353 returns to its original temperature, the magnetic field from the magnetic recording element 34 can be applied to the heated recording region. The core 35 has the constant thickness in the X-axis direction and a quadrangular XY cross section.

Since the laser diode 40 is fixed to the light source support substrate 230 and the first surface 2201 of the slider substrate 220 is fixed to the second surface 2300 of the light source support substrate 230, the slider substrate 220 and the laser diode 40 are kept in a fixed positional relation. Since the laser diode 40 faces the light entrance face 354 of the core, the long-distance propagation of light as in the conventional technology is avoided, so that the emitted light from the light emitting element can be guided to the medium-facing surface, while permitting some mounting error and coupling loss of light.

Figure 8:
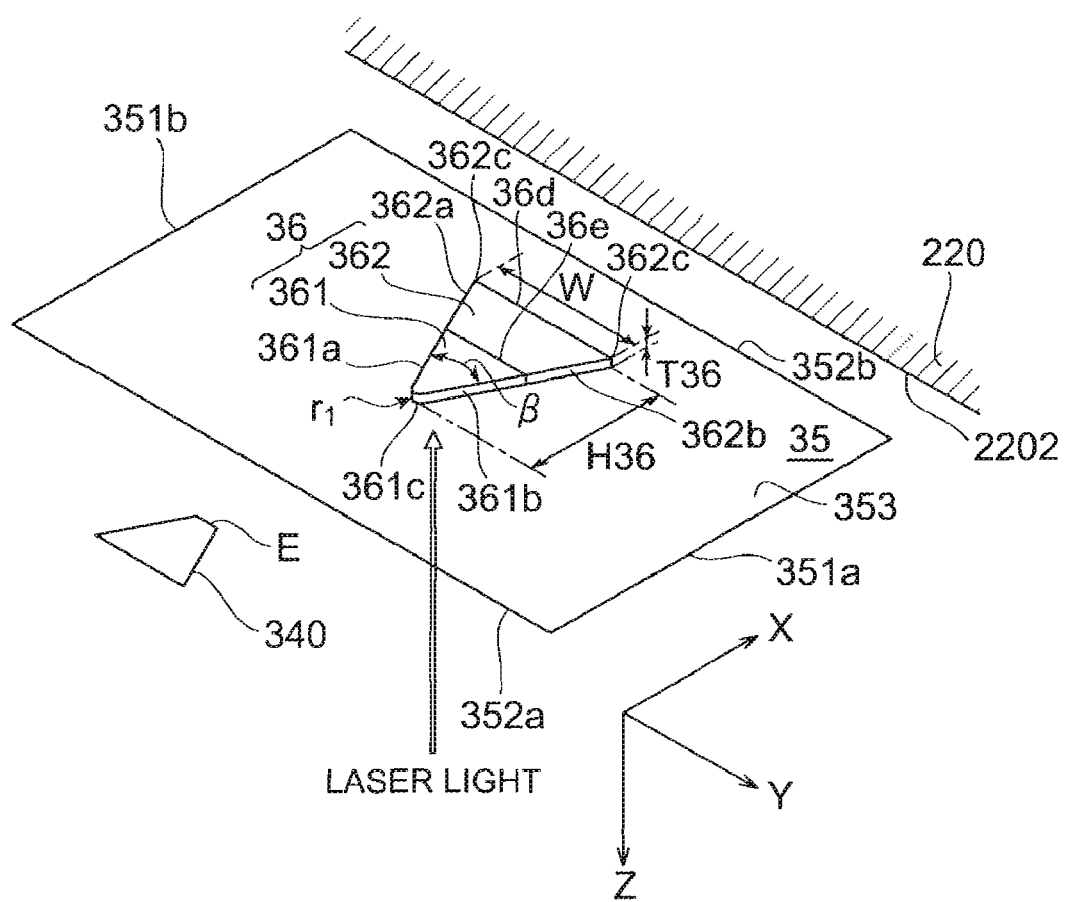
FIG. 8 is a perspective view of a near-field light generator (plasmon probe) 36 as seen from the medium-facing surface S.

FIG. 8 is a perspective view of the near-field light generator (plasmon probe) 36 as viewed from the medium-facing surface S.

The near-field light generator 36 is of a triangular shape when viewed from the medium-facing surface S, and is composed of the cusp portion 361 of a triangular shape disposed on the electromagnetic coil element 34 side (the main magnetic pole layer 340 side of the electromagnetic coil element 34) and the base portion 362 of a trapezoid shape disposed on the side opposite to the electromagnetic coil element 34 side. The base 36d of the triangular shape of the near-field light generator 36 is arranged in parallel with the integration surface 2202 of the slider substrate 220 or in parallel with the track width direction, and the tip 361c of the cusp portion 361 facing the base is arranged on the main magnetic pole layer 340 side of the electromagnetic coil element 34 with respect to the base 36d; specifically, the tip 361c is arranged opposite to the leading edge E of the main magnetic pole layer 340. A preferred form of the near-field light generator 36 is an isosceles triangle whose two base angles at the two ends of the base 36d are equal to each other.

The height H36 of the triangle of the near-field light generator 36 is preferably sufficiently smaller than the wavelength of incident laser light and preferably 20-400 nm. The width W of the base 36d is preferably sufficiently smaller than the wavelength of incident laser light and preferably 20-400 nm. The angle β at the vertex of the tip 361c is, for example, 60°.

The thickness T36 of the near-field light generator 36 is preferably 10-100 nm.

The aforementioned cusp portion 3611 and base portion 362 are made of their respective electroconductive materials different from each other. The materials forming the cusp portion 361 and the base portion 362 are selected so that, when λin represents the wavelength of the emitted light from the laser diode 40 immediately before the emitted light reaches the near-field light generator 36, the intensity of the near-field light generated when the material forming the cusp portion 361 is irradiated with the light of the wavelength λin is stronger than the intensity of the near-field light generated when the material forming the base portion 362 is irradiated with the light of the wavelength λin.

Specific combinations of the materials will be described below.

The intensities of near-field light generated are dependent on the shape of the near-field light generator and others. Therefore, the foregoing intensities of near-field light generated mean intensities of near-field light generated when it is assumed that the near-field light generators are formed in the same shape one from only the material forming the cusp portion 361 and the other from only the material forming the base portion 362 and when the light of the wavelength λin is made incident to these near-field light generators under the same condition.

The wavelength λin of the emitted light from the laser diode 40 immediately before the emitted light reaches the near-field light generator 36 is a value obtained by dividing the value of the wavelength $\lambda_L$ of the emitted light immediately after emission from the laser diode 40, by the value of the refractive index n of the material forming the core 35, in the present embodiment. Namely, $\lambda in = \lambda_L / n$.

The near-field light generated from the near-field light generator 36 of this configuration generally has the maximum intensity at the border of the near-field light generator 36 when viewed from the medium-facing surface S, tough it depends upon the wavelength of the incident laser light and the shape of the core 35. Particularly, the present embodiment is so arranged that the electric field vector of the light arriving at the near-field light generator 36 is directed in the stack direction (X-direction) of the laser diode 40. Therefore, radiation of the strongest near-field light occurs near the tip 361c. Namely, the part facing the vicinity of this tip 361c becomes a major heat-acting portion in the thermal assist action to heat a portion of the recording layer of the magnetic disk with light.

Since the electric field intensity of this near-field light is immeasurably stronger than that of the incident light, this very strong near-field light rapidly heats the opposed local part of the surface of the magnetic disk. This reduces the coercive force of this local part to a level allowing writing with the writing magnetic field, whereby writing with the electromagnetic coil element 34 becomes feasible even with use of the magnetic disk of a high coercive force for high-density recording. The near-field light penetrates to the depth of about 10-30 nm from the medium-facing surface S toward the surface of the magnetic disk. Therefore, under the present circumstances where the levitation amount is 10 nm or less, the near-field light can reach the recording layer part sufficiently. The width in the track width direction and the width in the medium-moving direction of the near-field light generated in this manner are approximately equal to the aforementioned reach depth of the near-field light, and the electric field intensity of this near-field light exponentially decreases with increase in the distance; therefore, the near-field light can heat the recording layer part of the magnetic disk in an extremely localized area.

Furthermore, in the present embodiment, emission of near-field light is adequately suppressed from the part other than the region near the tip 361c of the cusp portion 361 of the near-field light generator 36. Namely, if the whole of the near-field light generator 36 is made of one kind of material, the near-field light is emitted in some intensity even from the other part of the border of the near-field light generator 36, particularly, from near the vertices 362c of the base portion 362, and thus the radiation intensity of the near-field light becomes weaker near the tip 361c of the cusp portion 361 by that degree. When this happens, heating becomes insufficient in the recording region R of the magnetic recording medium and the coercive force of this region cannot be sufficiently lowered, which can cause writing failure during the operation of thermally assisted magnetic recording.

Furthermore, when the near-field light emitted from near the vertices 362c of the base portion 362 heats the region around the recording region R of the magnetic recording medium, writing or erasure can occur in the region around the recording region during the operation of thermally assisted magnetic recording, which could pose the problem of so-called "side erase."

In contrast to it, in the present embodiment the materials forming the cusp portion 361 and the base portion 362 are selected so that, when λin represents the wavelength of the emitted light from the laser diode 40 immediately before the emitted light reaches the near-field light generator 36, the intensity of the near-field light generated when the material forming the cusp portion 361 is irradiated with the light of the wavelength λin becomes stronger than the intensity of the near-field light generated when the material forming the base portion 362 is irradiated with the light of the wavelength λin. This suppresses the emission of the near-field light from near the vertices 362c of the base portion 362 and the radiation intensity becomes stronger of the near-field light from near the tip 361c of the cusp portion 361. Particularly, the base portion 362 with the lower radiation intensity is joined to the cusp portion 361 to form a border line. Since the base portion 362 is continuous to the original vertices on the border line side of the cusp portion 361 in this manner, emission is also suppressed from these vertices.

As a result, the recording region R of the magnetic recording medium is fully heated, and the coercive force of this region is sufficiently lowered, whereby occurrence of writing failure is suppressed well during the operation of thermally assisted magnetic recording. Since heating is adequately prevented in the region around the recording region R of the magnetic recording medium, writing or erasure is adequately prevented in the region around the recording region during the operation of thermally assisted magnetic recording, so as to suppress occurrence of "side erase."

Furthermore, in the present embodiment the cusp portion 361 of the near-field light generator 36 is closer to the main magnetic pole layer 340 of the electromagnetic coil element 34 than the base portion 362 of the near-field light generator 36. This shortens the distance between the tip 361c of the cusp portion 361 of the near-field light generator 36 where the near-field light is emitted at the maximum intensity, and the main magnetic pole layer 340. As a result, it can shorten the time from increase in the temperature of the recording region R by irradiation of this region of the magnetic recording medium with the near-field light, to application of the writing magnetic field to this region, and it becomes easier to apply the writing magnetic field to this region during the period in which the coercive force of the recording region R is sufficiently lowered.

In the present embodiment, the area of the planar shape of the cusp portion 361 of the near-field light generator 36 as viewed from the side of the medium-facing surface S (cf. FIG. 4) is smaller than the area of the planar shape of the base portion 362 of the near-field light generator 36 as viewed from the medium-facing surface S side. Since this sufficiently increases the volume of the base portion 362 of the near-field light generator 36, emission of the near-field light is adequately prevented from the part other than the region near the tip 361c of the cusp portion 361. However, the magnitude relation may be reverse between the areas of the planar shapes of the cusp portion 361 and the base portion 362. Even in that case, the intensity of the near-field light emitted from near the tip 361c of the cusp portion 361 becomes stronger than in the case where the near-field light generator 36 is made of one kind of material, whereby emission of near-field light is suppressed from the part other than the region near the tip 361c.

In the present embodiment, the planar shape of the near-field light generator 36 as viewed from the medium-facing surface S side is arranged as follows: a side 361a of the cusp portion 361 in contact with one end of a border line 36e between the cusp portion 361 and the base portion 362, and a side 362a of the base portion 362 in contact with the one end of the border line 36e are linearly continuous without any level difference; and a side 361b of the cusp portion 361 in contact with the other end of the border line 36e, and a side 362b of the base portion 362 in contact with the other end of the border line 36e are linearly continuous without any level difference.

If these portions are not linear and have a level difference, sharp-pointed portions out of contact with the electroconductive material are formed in the cusp portion 361 or in the base portion 362. Since such portions are likely to emit near-field light, the near-field light becomes also radiated from the part other than the region near the tip 361c of the cusp portion 361 of the near-field light generator 36. Since there are no such level differences in the present embodiment, the emission of near-field light is effectively suppressed from the part other than the region near the tip 361c of the cusp portion 361 of the near-field light generator 36. It is, however, noted that a definite unwanted light suppressing effect is achieved even if there is such a level difference in the near-field light generator 36. Namely, in this case, the emission of near-field light can also be suppressed from the part other than the region near the tip 361c, when compared with the case where the near-field light generator 36 of the same shape is made of one kind of material.

Figure 9:
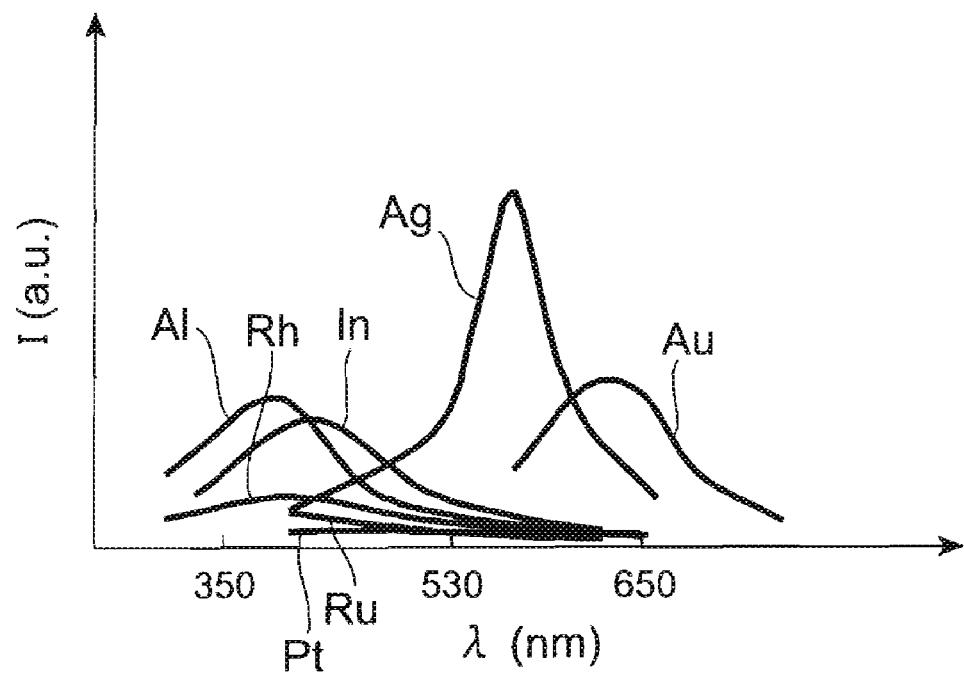
FIG. 9 is a graph showing the simulation results of relationship of wavelength λ (nm) of incident light to the near-field light generator against near-field light intensity I (a.u.).

FIG. 9 is a graph showing the results of simulation of relationship between wavelength λ (nm) of incident light to the near-field light generator and intensity I (a.u.) of near-field light. The condition of the simulation was that the near-field light generators were formed in the same shape and of Al alone, Ag alone, Au alone, Rh alone, In alone, Ru alone, and Pt alone and incident light of the wavelength λ was made incident to each of the near-field light generators.

As shown in FIG. 9, it is seen that when Al is used as the near-field light generator, an intensity peak of near-field light appears near the wavelength λ (nm) of incident light of 350 nm; when Ag is used, an intensity peak appears near 530 nm; when Au is used, an intensity peak appears near 650 μm. When attention is focused on the case where the incident light of a specific wavelength is made incident, it is seen that the intensity of near-field light differs with incidence of the incident light of the specific wavelength, depending upon the materials forming the near-field light generator. Therefore, applicable combinations of materials are as described below, for the near-field light generator 36 in FIG. 8, where the wavelength λin immediately before the emitted light from the laser diode 40 reaches the near-field light generator 36 is in each of ranges as described below.

When λin is 350-420 nm, the combination (a, b) of the material (a) forming the cusp portion 361, with the material (b) forming the base portion 362 can be, for example, (Al, Ag), (Al, Rh), (Al, Ru), or (Al, Pt) in the order of the cusp portion 361 and the base portion 362.

When λin is 500-560 nm, the combination (a, b) can be, for example, (Ag, Al), (Ag, Au), (Au, Al), (Au, Ru), (Au, Pt), (Au, In), (Au, Rh), (Ag, In), (Ag, Rh), (Ag, Ru), or (Ag, Pt) in the order of the cusp portion 361 and the base portion 362.

when λin is 500-560 nm, the combination (a, b) can also be, for example, (Au, Pd), (AuCu, Pt), (AuCu, In), (AuCu, Al), (AuCu, Pd), or (AuCu, Rh).

When λin is 620-700 nm, the combination (a, b) of materials can be, for example, (Au, Ag), (Au, Al), or (Au, Rh) in the order of the cusp portion 361 and the base portion 362.

When a combination of materials satisfies the magnitude relation of intensity peaks within the range where they can be read from the aforementioned graph, the combination of the materials is also applicable. The wavelength λin may be appropriately selected so as to achieve the aforementioned effect.

Among the above-described materials, particularly preferred combinations of materials in terms of generation of near-field light are as follows: (Ag, Al), (Au, Al), (Au, Ru), (Au, Pt), (Au, Pd), (Au, In), (Au, Rh), (AuCu, Pt), (AuCu, In), (AuCu, Al), (AuCu, Pd), (AuCu, Rh), (Ag, In), (Ag, Rh), (Ag, Ru), (Ag, Pt), (Al, Rh), (Al, Ru, or (Al, Pt). When the wavelength λin of incident light is in the visible light range, the combination (a, b) of the materials of the cusp portion and the base portion can be selected from the materials in the aforementioned wavelength ranges of λin of 500 to 560 nm and 620 to 700 nm; when the wavelength λin of incident light is in the ultraviolet region, the combination of materials can be selected from those in the case where the wavelength λin is 350-420 nm. When compared with the combinations of (Al, Ag), (Ag, Au), and (Au, Ag), it is more preferable to select the other materials described above, in terms of hie relative intensity of emission of near-field light, oxidation resistance, and so on.

It is a matter of course that the wavelength λin immediately before the emitted light from the laser diode 40 reaches the near-field light generator 36 is not limited to near the wavelength of the incident light at the peak intensity of the near-field light emitted from the material forming the cusp portion 361, but may be any wavelength that satisfies the condition that the intensity of the near-field light emitted from the material forming the cusp portion 361 becomes stronger than the intensity of the near-field light emitted from the material forming the base portion 362.

The shape of the near-field light generator 36 is not limited to the above-described one, but a variety of modifications can be contemplated. FIGS. 10 and 11 show modification examples of the shape of the near-field light generator 36, and are schematic views of the planar shape of the near-field light generator 36 as viewed from the medium-facing surface S side.

Figure 10A:
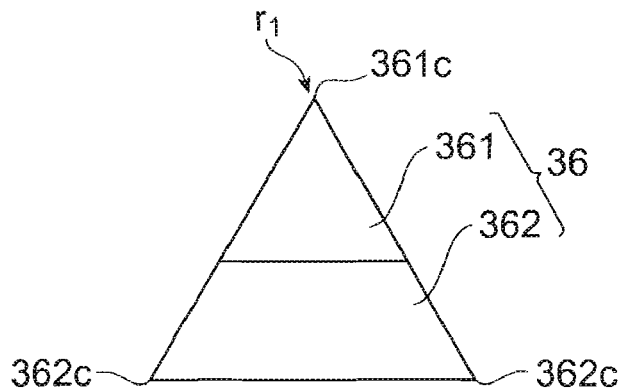
FIG. 10A is a drawing showing modification example of the near-field light generator 36.
Figure 10B:
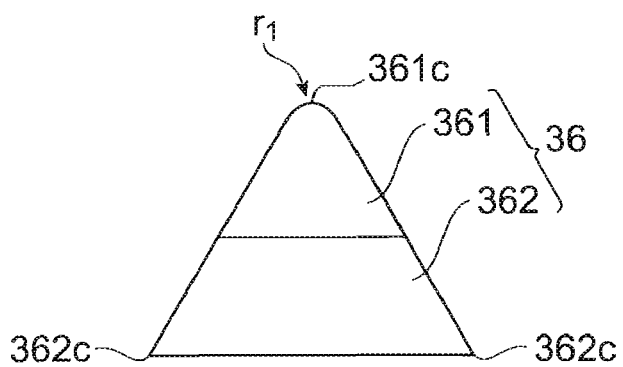
FIG. 10B is a drawing showing modification example of the near-field light generator 36.
Figure 10C:
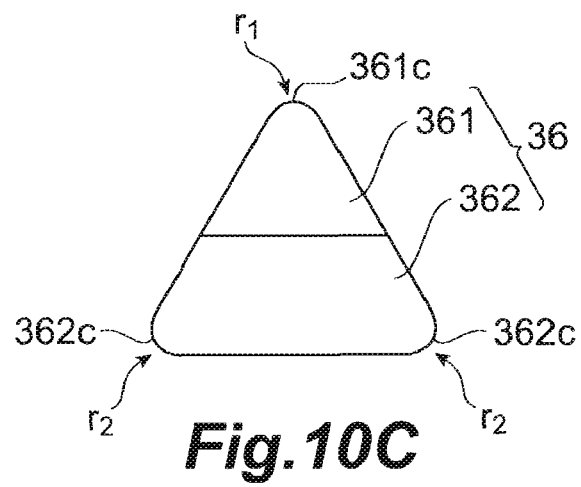
FIG. 10C is a drawing showing modification example of the near-field light generator 36.
Figure 10D:
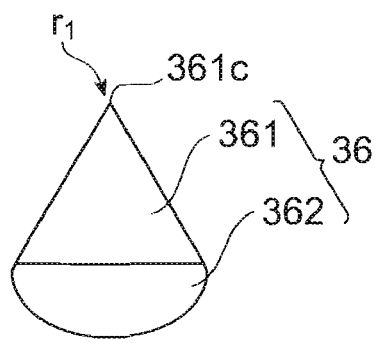
FIG. 10D is a drawing showing modification example of the near-field light generator 36.
Figure 10E:
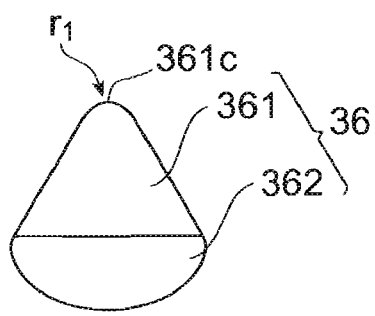
FIG. 10E is a drawing showing modification example of the near-field light generator 36.
Figure 11A:
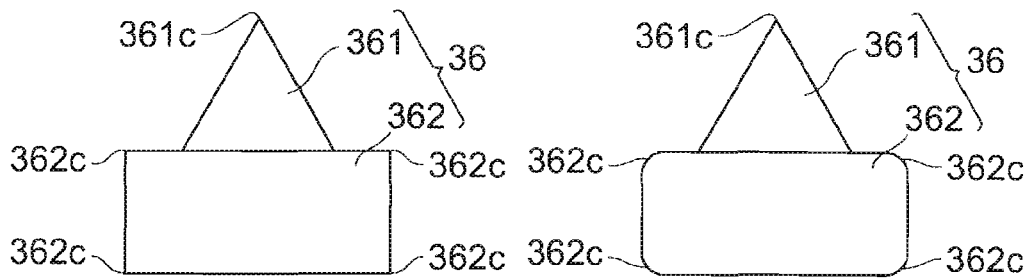
FIG. 11A is a drawing showing another modification example of the near-field light generator 36.
Figure 11B:
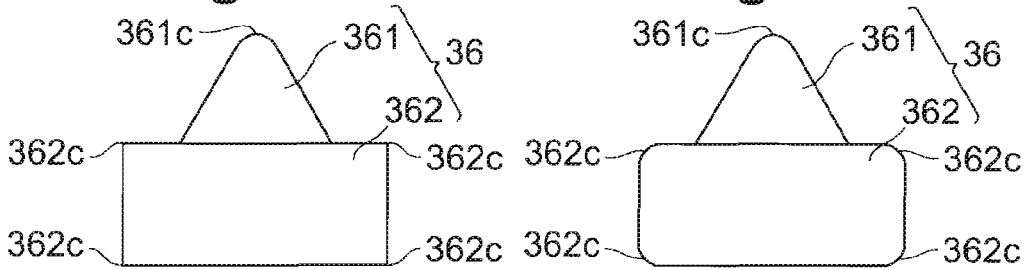
FIG. 11B is a drawing showing another modification example of the near-field light generator 36.
Figure 11C:
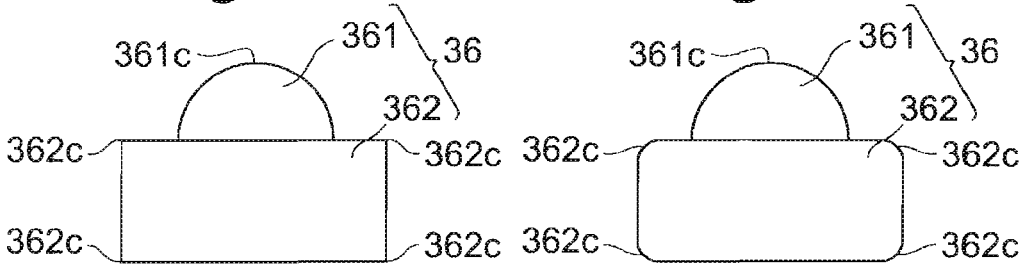
FIG. 11C is a drawing showing another modification example of the near-field light generator 36.
Figure 11D:
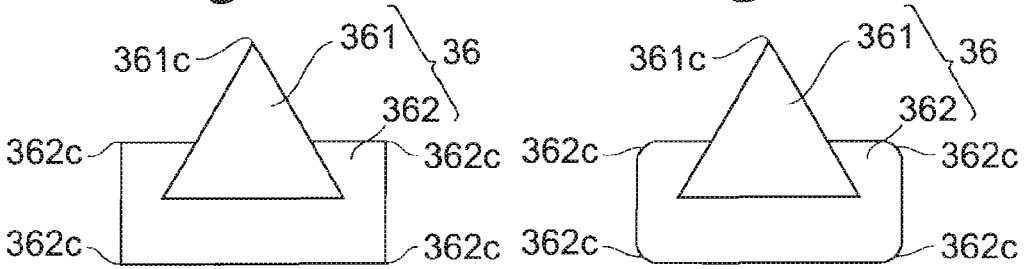
FIG. 11D is a drawing showing another modification example of the near-field light generator 36.
Figure 11E:
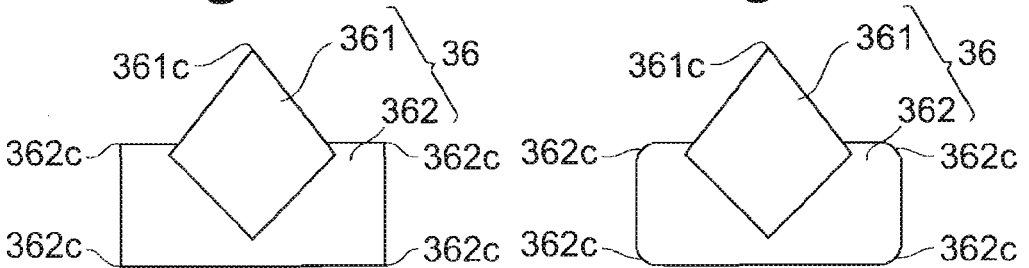
FIG. 11E is a drawing showing another modification example of the near-field light generator 36.
Figure 11F:
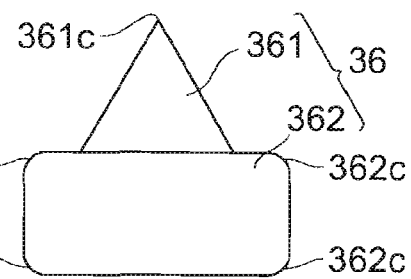
FIG. 11F is a drawing showing other modification example of the near-field light generator 36.
Figure 11G:
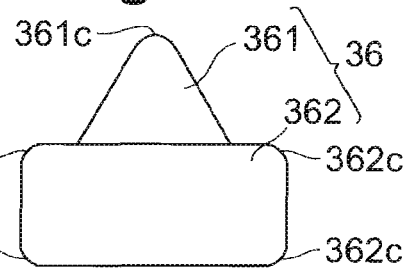
FIG. 11G is a drawing showing another modification example of the near-field light generator 36.
Figure 11H:
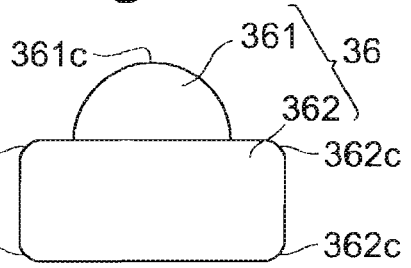
FIG. 11H is a drawing showing another modification example of the near-field light generator 36.
Figure 11I:
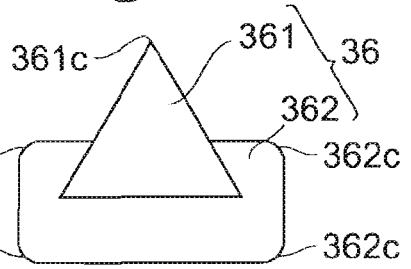
FIG. 11I is a drawing showing another modification example of the near-field light generator 36.
Figure 11J:
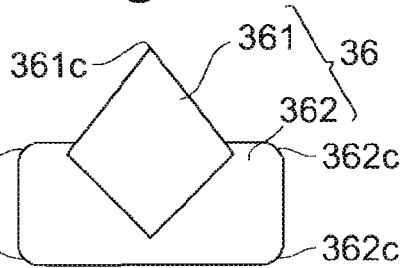
FIG. 11J is a drawing showing another modification example of the near-field light generator 36.

FIG. 10A shows the near-field light generator 36 shown in FIG. 8. In FIG. 10B, the radius $r_1$ of curvature at the tip 361c of the cusp portion 361 is larger than that in FIG. 10A. The tip 361c does not always have to be sharp-pointed, and the radius $r_1$ of curvature thereof can be, for example, 10-200 nm. In FIG. 10C, the radius $r_2$ of curvature at the vertices 362c of the base portion 362 is larger than that in FIG. 10B. When this radius $r_2$ of curvature is larger than the radius $r_1$ of curvature, emission of near-field light is further efficiently suppressed from the base portion 362. As shown in FIG. 10D, the base portion 362 may be a part of an elliptical shape having no vertex 362c. Furthermore, it is also possible to adopt a shape as shown in FIG. 10E where the radius of curvature is made larger at the tip 361c in FIG. 10D.

FIG. 11 shows further modification examples of the near-field light generator 36. As shown in FIG. 11A, the near-field light generator 36 may be comprised of the cusp portion 361 of a triangular shape and the base portion 362 of a rectangular shape. As shown in FIG. 11B, the radius $r_1$ of curvature at the tip 361c may be made larger than that in FIG. 11A. The radius $r_1$ of curvature in this case can also be, for example, 10-200 nm as in the aforementioned case. Furthermore, as shown in FIG. 11C, the cusp portion 361 may be of a semicircular shape. Furthermore, as shown in FIG. 11D and FIG. 11E, the cusp portion 361 of a triangular shape or a quadrangular shape can be formed as buried in the base portion 362 of a rectangular shape. In each of FIG. 11F to FIG. 11J, the radius $r_2$ of curvature at the vertices 362c of the base portion 362 is made larger than that in FIG. 11A to FIG. 11E. When this radius $r_2$ of curvature is larger than the radius $r_1$ of curvature, emission of near-field light is efficiently suppressed from the base portion 362.

The near-field light generator 36 is not limited to the arrangement where the cusp portion 361 is closer to the main magnetic pole layer 340 of the electromagnetic coil element 34 than the base portion 362 of the near-field light generator 36 as shown in FIG. 8, but the base portion 362 may also be located nearer to the main magnetic pole layer 340 of the electromagnetic coil element 34 than the cusp portion 361. Furthermore, the electroconductive materials forming the cusp portion 361 and the base portion 362 do not have to be limited to the single metal materials, but may be alloys of two or more metals. Furthermore, the near-field light generator 36 may be comprised of the cusp portion 361 and a plurality of base portions. In this case, the materials forming the cusp portion 361 and the plurality of base portions are selected so that the intensity of the near-field light generated when the material forming the cusp portion 361 is irradiated with the light of the wavelength $\lambda$in is stronger than the intensity of the near-field light generated when each of the materials forming the plurality of base portions is irradiated with the light of the wavelength $\lambda$in.

(Light Source Unit)

The components of the light source unit 23 in the thermally assisted magnetic head 21 will be described below again with reference to FIGS. 3 and 4.

The light source unit 23 mainly has a light source support substrate 230 and a laser diode (light emitting element) 40 whose contour is platelike.

The light source support substrate 230 is a substrate of AlTiC ($Al_2O_3$—TiC) or the like and has the bond surface 2300 bonded to the back surface 2201 of the slider substrate 220. A heat insulation layer 230a of alumina or the like is formed on the bond surface 2300. An insulating layer 41 of an insulating material such as alumina is disposed on an element forming surface 2302 being one side surface when the bond surface 2300 is regarded as a bottom surface. The electrode pads 47, 48 are formed on this insulating layer 41, and the laser diode 40 is fixed on the electrode pad 47.

The electrode pads 47, 48 are formed for driving of laser, on a surface 411 being the front surface of the insulating layer 41 and intersecting with the medium-facing surface S and, in other words, they are formed on the surface 411 parallel to the integration surface 2202 of the slider substrate 220.

The electrode pad 47, as shown in FIG. 4, is electrically connected through a via hole 47a provided in the insulating layer 41, to the light source support substrate 230. The electrode pad 47 also functions as a heat sink for leading heat during driving of the laser diode 40 through the via hole 47a to the light source support substrate 230 side.

The electrode pad 47, as shown in FIG. 3, is formed so as to extend in the track width direction in the central region of the surface 411 of the insulating layer 41. On the other hand, the electrode pad 48 is formed at a position separate in the track width direction from the electrode pad 47. Each of the electrode pads 47, 48 further extends toward the flexure 201 side, for connection with the flexure 201 by solder reflow.

The electrode pads 47, 48 are electrically connected to the electrode pads 247, 248 of the flexure 201, respectively, by reflow soldering, whereby the light source can be driven. Since the electrode pad 47 is electrically connected to the light source support substrate 230 as described above, the potential of the light source support substrate 230 can be controlled, for example, to the ground potential by the electrode pad 247.

The electrode pads 47, 48 can be comprised, for example, of layers of Au, Cu, or the like made in the thickness of about 1-3 μm and by vacuum evaporation, sputtering, or the like, which are formed, for example, through a ground layer of Ta, Ti, or the like about 10 nm thick.

The laser diode 40 is electrically connected onto the electrode pad 47 by a solder layer 42 (cf. FIG. 4) of an electrically conductive solder material such as Au—Sn. At this time, the laser diode 40 is located relative to the electrode pad 47 so as to cover only a part of the electrode pad 47.

Figure 12:
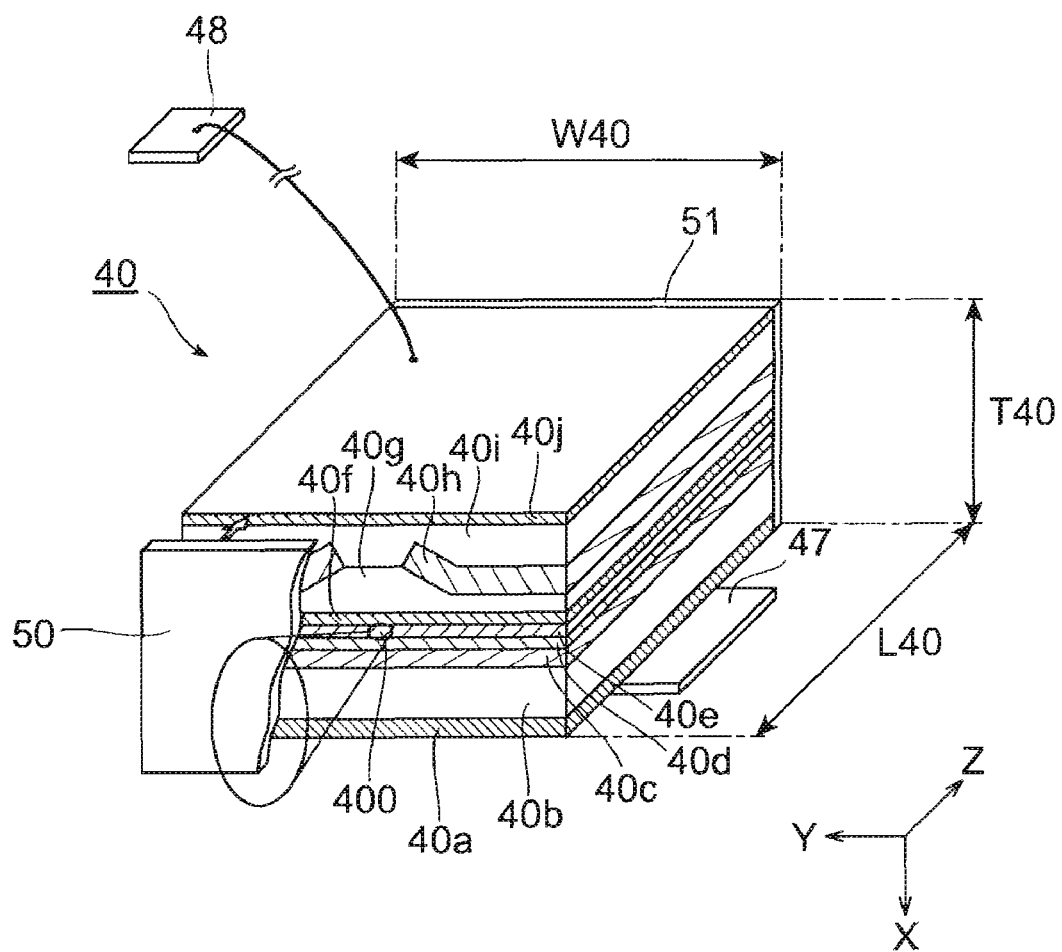
FIG. 12 is a perspective view of a laser diode 40.

FIG. 12 is a perspective view of the laser diode 40.

The laser diode 40 may have the same structure as the one normally used for an optical disk storage, and, for example, has a structure in which the following layers are stacked in order: an n-electrode 40a; an n-GaAs substrate 40b; an n-InGaAlP cladding layer 40c; a first InGaAlP guide layer 40d; an active layer 40e consisting of multiple quantum wells (InGaP/InGaAlP) or the like; a second InGaAlP guide layer 40f; a p-InGaAlP cladding layer 40g; an *n-GaAs current blocking layer 40h; a p-GaAs contact layer 40i; a p-electrode 40j. Reflecting films 50 and 51 of $SiO_2$, $Al_2O_3$, or the like for exciting oscillation by total reflection are deposited before and after cleavage faces of the multilayer structure, and an aperture is provided at the position of the active layer 40e in one reflecting film 50, at an output end 400 for emission of laser light. The laser diode 40 of this configuration emits laser light from the output end 400 when a voltage is applied thereto in the film thickness direction.

Concerning the wavelength $\lambda_L$ of the emitted laser light, the laser diode to emit the laser light of the appropriate wavelength $\lambda_L$, is selected in consideration of the shape and metal material of the near-field light generator 36 and the refractive index n of the material forming the core 35, as described above. Namely, when $\lambda$in is the wavelength of the emitted light from the laser diode 40 immediately before it reaches the near-field light generator 36, the intensity of the near-field light generated when the material forming the cusp portion 361 (cf. FIG. 8) is irradiated with the light of the wavelength $\lambda$in, is set to be stronger than the intensity of the near-field light generated when the material forming the base portion 362 (cf. FIG. 8) is irradiated with the light of the wavelength $\lambda$in.

The size of the laser diode 40 is, for example, the width (W40) of 200-350 μm, the length (depth L40) of 250-600 μm, and the thickness (T40) of about 60-200 μm, as described above. The width W40 of the laser diode 40 can be decreased, for example, to about 100 μm, while the minimum thereof is a spacing between opposed ends of the current blocking layer 40h. However, the length of the laser diode 40 is the quantity associated with the electric current density and thus cannot be decreased so much. In either case, the laser diode 40 is preferably dimensioned in a sufficient size, in consideration of handling during mounting.

A power supply in the hard disk drive can be used for driving of this laser diode 40. In practice, the hard disk drive is usually equipped, for example, with the power supply of about 2 V, which is a sufficient voltage for the lasing operation. The power consumption of the laser diode 40 is also, for example, approximately several ten mW, which the power supply in the hard disk drive can fully provide.

The n-electrode 40a of the laser diode 40 is fixed to the electrode pad 47 by the solder layer 42 such as AuSn (cf. FIG. 4). The laser diode 40 is fixed to the light source support substrate 230 so that the output end (light emission face) 400 of the laser diode 40 is directed downward (in the –Z-direction) in FIG. 4, i.e., so that the output end 400 becomes parallel to the bond surface 2300; whereby the output end 400 can face the light entrance face 354 of the core 35 of the slider 22. In practical fixing of the laser diode 40, for example, an evaporated film of AuSn alloy is deposited in the thickness of about 0.7-1 µm on the surface of the electrode pad 47, the laser diode 40 is mounted thereon, and thereafter it is heated to be fixed, to about 200-300° C. by a hot plate or the like under a hot air blower.

The electrode pad 48 is electrically connected through a bonding wire to the p-electrode 40j of the laser diode 40. It is also possible to adopt a connection method not using the bonding wire, in which the insulating layer 41 is provided with a level difference to decrease the distance between the electrode pad 48 and the p-electrode 40j of the laser diode 40 and these are electrically connected by a solder such as AuSn. The electrode connected to the electrode pad 47 may also be the p-electrode 40j, instead of the n-electrode 40a, and in this case, the n-electrode 40a is connected through a bonding wire to the electrode pad 48.

In the case of soldering with the aforementioned AuSn alloy, the light source unit is heated, for example, to the high temperature of about 300° C., but according to the present embodiment, this light source unit 23 is produced separately from the slider 22; therefore, the magnetic head portion in the slider is prevented from being adversely affected by this high temperature.

The back surface 2201 of the aforementioned slider 22 and the bond surface 2300 of the light source unit 23 are bonded, for example, with an adhesive layer 44 such as a UV cure type adhesive (cf. FIG. 4) and the output end 400 of the laser diode 40 is arranged opposite to the light entrance face 354 of the core 35.

The configurations of the laser diode 40 and the electrode pads do not always have to be limited to those in the above-described embodiment, of course, and, for example, the laser diode 40 may be one of another configuration using other semiconductor materials, such as GaAlAs type materials. Furthermore, it is also possible to use any other brazing, material, for the soldering between the laser diode 40 and the electrodes. Yet furthermore, the laser diode 40 may be formed directly on the unit substrate by epitaxially growing the semiconductor materials.

(Production Method)

Subsequently, a method of producing the thermally assisted magnetic head described above will be described below briefly.

First, the slider 22 is produced. Specifically, the slider substrate 220 is prepared, the MR effect element 33 and interelement shield layer 148 are formed by well-known methods, and the insulating layer 38 of alumina or the like is further formed as a ground layer.

Subsequently, the core 35 and near-field light generator 36 are formed. This process will be described in detail with reference to FIGS. 13 and 14.

FIGS. 13 and 14 are perspective views to illustrate an embodiment of the method of forming the core 35 and the near-field light generator 36.

Figure 13A:
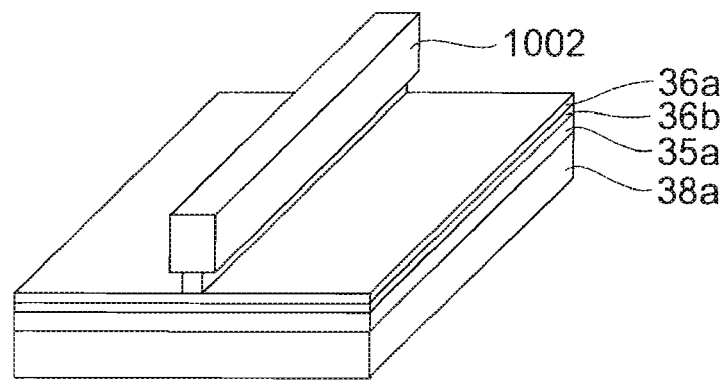
FIG. 13A is a perspective view for explaining an embodiment of a method of forming the core 35 and near-field light generator 36.

In the first step, as shown in FIG. 13A, a dielectric film 35a of $Ta_2O_5$ or the like with the refractive index higher than that of the insulating layer 38a, which will be a part of the core 35, is first deposited on the insulating layer 38a of $Al_2O_3$ or the like, metal layer 36b and metal layer 36a of Au, Ag, Ru, Pt, or the like are then deposited thereon in order, and a resist pattern 1002 depressed for liftoff in the bottom part is formed thereon.

Figure 13B:
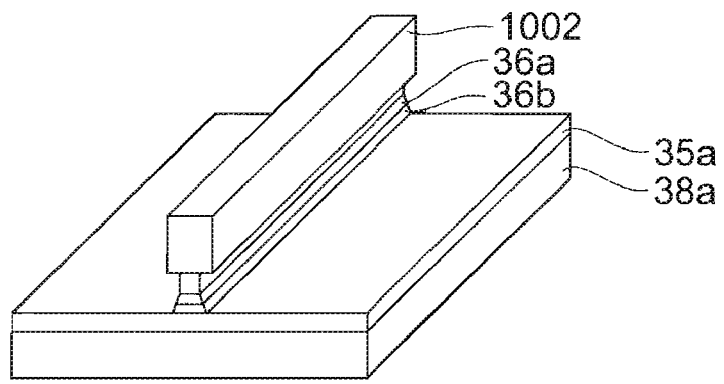
FIG. 13B is a perspective view for explaining an embodiment of a method of forming the core 35 and near-field light generator 36.

In the next step, as shown in FIG. 13B, unnecessary portions of the metal later 36b and metal layer 36a are removed except immediately below the resist pattern 1002 by ion milling or the like, thereby forming a pattern of the metal layer 36b and metal layer 36a of a trapezoid shape wider in the bottom as deposited on the dielectric film 35a.

Figure 13C:
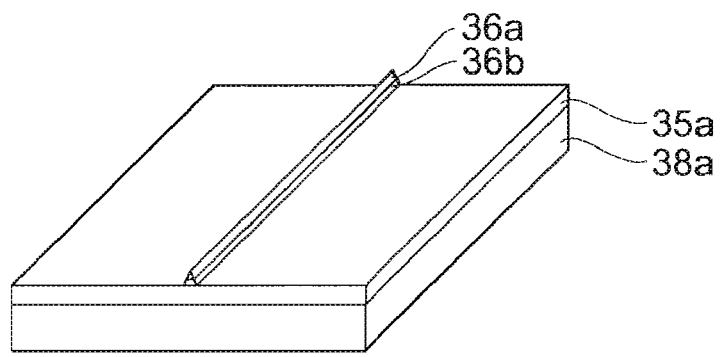
FIG. 13C is a perspective view for explaining an embodiment of a method of forming the core 35 and near-field light generator 36.

In the subsequent step, as shown in FIG. 13C, the resist pattern 1002 is removed, and a part of each slope is removed from the two slope sides of the metal layer 36b and metal layer 36a of the trapezoid shape by ion milling or the like, to form the metal layer 36b in a trapezoid sectional shape and the metal layer 36a in a triangular sectional shape.

Figure 13D:
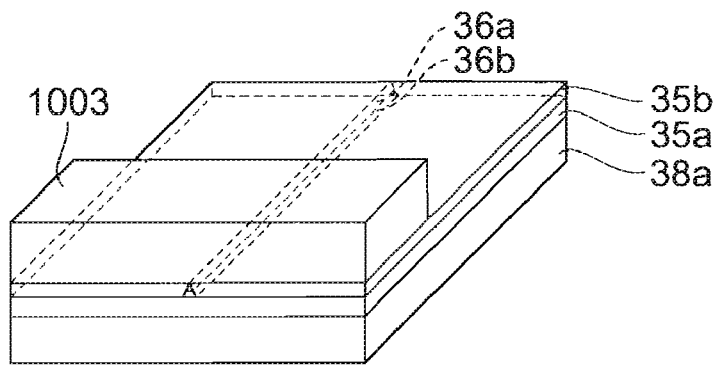
FIG. 13D is a perspective view for explaining an embodiment of a method of forming the core 35 and near-field light generator 36.
Figure 14A:
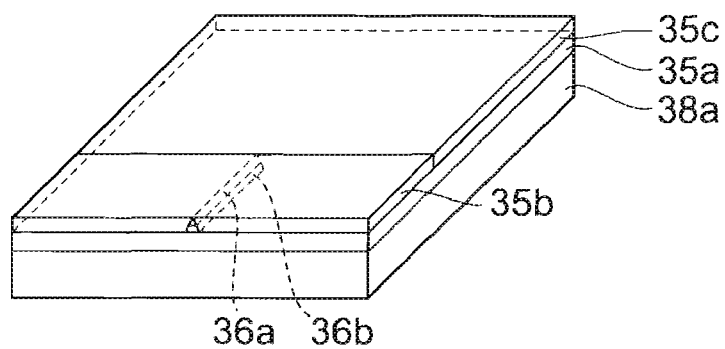
FIG. 14A is a perspective view for explaining the embodiment of the method of forming the core 35 and near-field light generator 36.

Subsequently, as shown in FIG. 13D, a dielectric film 35b of the same material as the dielectric film 35a is deposited on the dielectric film 35a so as to cover the metal layer 36b and metal layer 36a, a resist pattern 1003 for formation of the end faces of the metal layer 36b and metal layer 36a is laid on the side where the medium-facing surface will be formed, the metal layer 36b, the metal layer 36a, and the dielectric film 35b are removed by ion milling or the like, from the side opposite to the side where the medium-facing surface will be formed, as shown in FIG. 14A, and thereafter a dielectric film 35c of the same material as the dielectric film 35b is deposited on the removed portion.

Figure 14B:
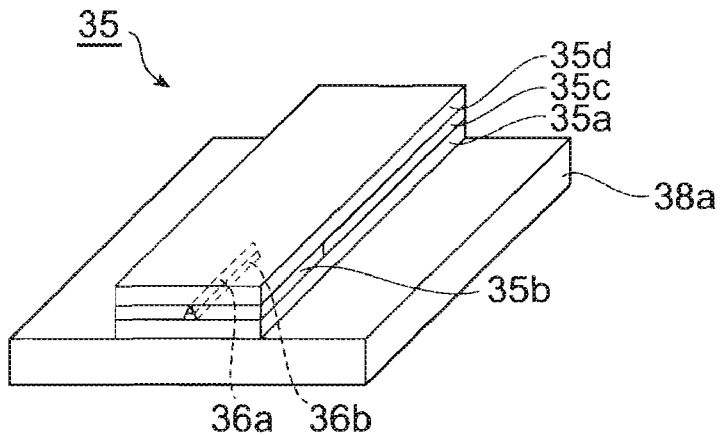
FIG. 14B is a perspective view for explaining the embodiment of the method of forming the core 35 and near-field light generator 36.

Furthermore, as shown in FIG. 14B, a dielectric film 35d of the same material as the dielectric film 35b is further deposited on the dielectric films 35b, 35c, and the dielectric films 35a, 35b, 35c, 35d are patterned so as to achieve a predetermined width, thereby almost completing the core 35.

Figure 14C:
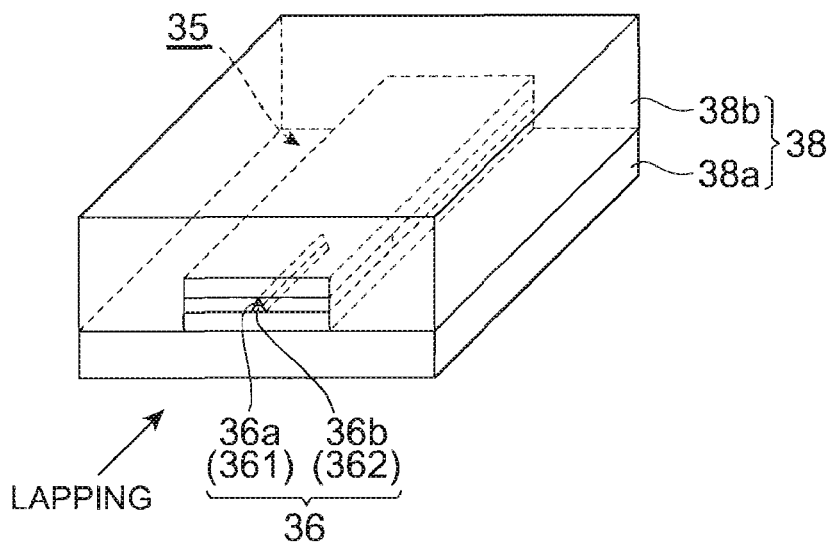
FIG. 14C is a perspective view for explaining the embodiment of the method of forming the core 35 and near-field light generator 36.

Thereafter, as shown in FIG. 14C, an insulating layer 38b of the same material as the insulating layer 38a is further formed so as to cover the core 35, thereby completing the insulating layer 38 as a cladding layer Then lapping is performed by a predetermined distance from the side where the metal layer 36b and metal layer 36a are exposed, as described later, to form the near-field light generator 36 of the predetermined thickness and the medium-facing surface S. The metal layer 36a becomes the cusp portion 361 of the near-field light generator 36 and the metal layer 36b becomes the base portion 362 of the near-field light generator 36.

The above steps can form the core 35 with the near-field light generator 36.

After that, the electromagnetic coil element 34 is formed by the well-known method as shown in FIG. 4, and then the insulating layer 38 of alumina or the like is formed. Furthermore, the electrode pads 371 and others for correction are formed and thereafter lapping of the air bearing surface and the back surface thereof is performed to complete the slider 22. After this step, tests of the electromagnetic coil element 34 and the MR effect element 33 of slider 22 are conducted for each slider, to select a nondefective product.

Subsequently, the light source unit 23 is produced. In the first step, as shown in FIG. 4, the light source support substrate 230 of AlTiC or the like is prepared, the heat insulation layer 230a, insulating layer 41, and electrode pads 47, 48 are formed on the surfaces of the substrate by well-known methods, the laser diode 40 is fixed on the electrode pad 47 by an electrically conductive solder material such as AuSn, and thereafter the substrate is shaped into a predetermined size by separation by cutting or the like. This completes the light source unit 23. The light source unit obtained in this manner is also subjected to characteristic evaluation of the laser diode, particularly observation of a profile of drive current by a high-temperature continuous conduction test, to select one considered to have a sufficiently long life.

Figure 15A:
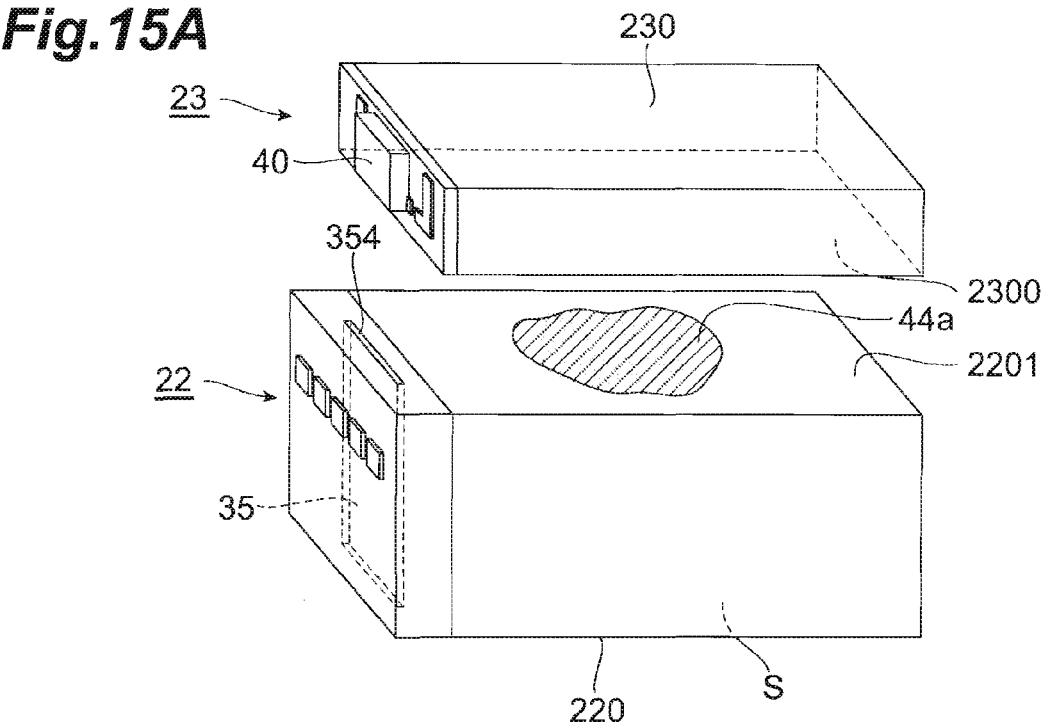
FIG. 15A is a perspective view showing a production method of the thermally assisted magnetic head.

After that, as shown in FIG. 15A, a UV cure type adhesive 44a is applied onto either or both of the bond surface 2300 of the light source unit 23 as a nondefective unit and the back surface 2201 of the slider 22 as a nondefective unit. The UV cure type adhesive can be a UV cure type epoxy resin, a UV cure type acrylic resin, or the like.

Figure 15B:
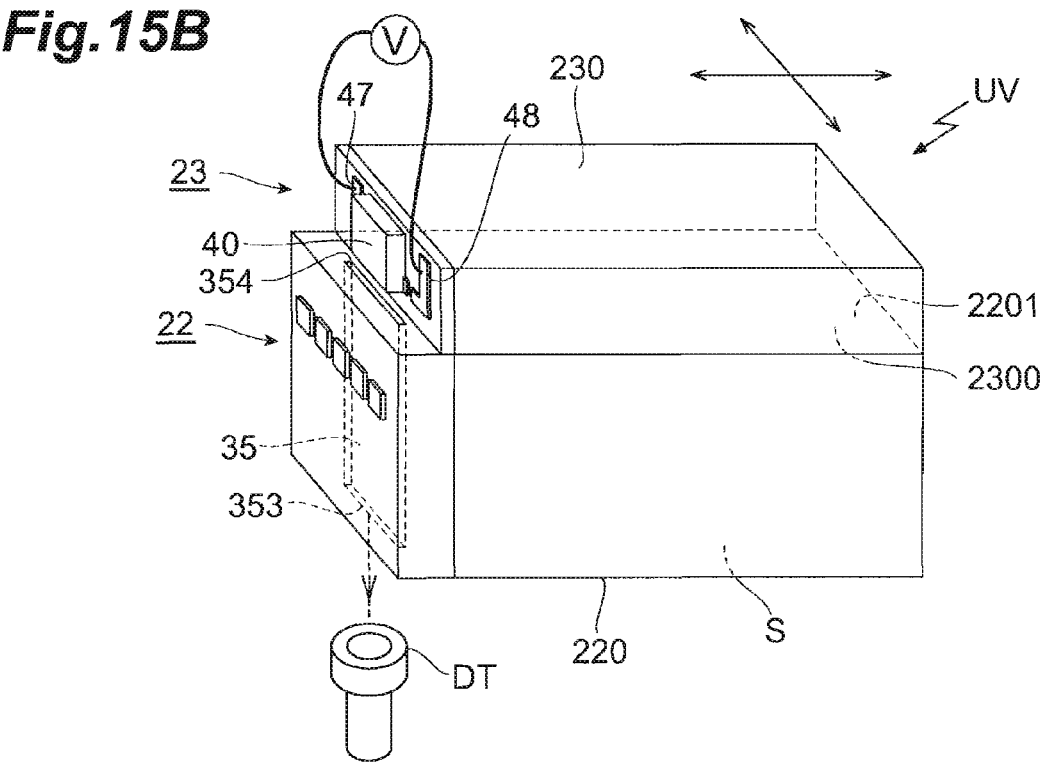
FIG. 15B is a perspective view showing a production method of the thermally assisted magnetic head.

Then, as shown in FIG. 15B, the bond surface 2300 of the light source unit 23 and the back surface 2201 of the slider 22 are laid on each other, and then the laser diode 40 is activated with application of a voltage between the electrode pads 47, 48, and a photodetector DT is opposed to the light exit face 353 of the core 35. The light source unit 23 and the slider 225 are relatively moved in directions of arrows in FIG. 15B to find out a position where the output from the photodetector DT becomes maximum. At that position, UV light is applied from the outside onto the UV cure type adhesive to cure the UV cure type adhesive 44a, which can bond the light source unit 23 and the slider 22 to each other in a state in which the optical axis of the laser diode is aligned with the optical axis of the core 35.

Subsequently, the action of the thermally assisted magnetic head 21 according to the present embodiment will be described below.

During a writing or reading operation, the thermally assisted magnetic head 21 hydromechanically floats up by a predetermined levitation amount above the surface of the rotating magnetic disk (medium) 10. On this occasion, the ends on the medium-facing surface S side of the MR effect element 33 and the electromagnetic coil element 34 are opposed through a small spacing to the magnetic disk 10, thereby implementing readout by sensing of a data signal magnetic field and writing by application of a data signal magnetic field.

On the occasion of writing of a data signal, the laser light having propagated from the light source unit 23 through the core 35 reaches the near-field light generator 36, whereupon the near-field light generator 36 generates the near-field light. This near-field light enables execution of the thermally assisted magnetic recording.

By adopting the thermally assisted magnetic recording, it also becomes feasible to achieve, for example, the recording density of 1 Tbits/in$^2$ order, by performing writing on the magnetic disk of a high coercive force by means of the thin film magnetic head for perpendicular magnetic recording to record recording bits in an extremely fine size.

The present embodiment uses the light source unit 23, so that the laser light propagating in the direction parallel to the layer surface of the core 35 can be made incident to the light entrance face (end face) 354 of the core 35 of the slider 22. Namely, the laser light of appropriate size and direction can be surely supplied in the thermally assisted magnetic head 21 having the configuration in which the integration surface 2202 and the medium-facing surface S are perpendicular to each other. As a result, it is feasible to implement the thermally assisted magnetic recording with high heating efficiency of the recording layer of the magnetic disk.

Since in the present embodiment the magnetic head portion 32 is fixed to the slider substrate 220 and the laser diode 40 as the light source is separately fixed to the light source support substrate 230, the thermally assisted magnetic head 21 as a nondefective product can be produced with a good yield by individually testing each of the electromagnetic coil element 34 fixed to the slider substrate 220 and the laser diode 40 fixed to the light source support substrate 230, and thereafter fixing the slider 22 as a nondefective unit and the light source unit 23 as a nondefective unit to each other.

Since the magnetic head portion 32 is disposed on the side surface of the slider substrate 220, the electromagnetic coil element 34, the MR effect element 33, and others of the magnetic head portion 32 can be readily formed by the production methods of the conventional thin film magnetic heads.

Furthermore, since the laser diode 40 is located at the position apart from the medium-facing surface S and near the slider 22, it is feasible to suppress the adverse effect of the heat generated from the laser diode 40, on the electromagnetic coil element 34, the MR effect element 33, etc., and the possibilities of contact or the like between the laser diode 40 and the magnetic disk 10, to reduce the propagation loss of light because of the dispensability of an optical fiber, a lens, a mirror, etc., and to simplify the structure of the entire magnetic recording apparatus.

Since in the present embodiment the heat insulation layer 230a is formed on the back surface of the light source support substrate 230, the heat generated from the laser diode 40 is less likely to be transferred to the slider 22.

In the above embodiment the slider substrate 220 and the light source support substrate 230 were the substrates of the same material of AlTiC, but it is also possible to use substrates of different materials. In this case, where the thermal conductivity of the slider substrate 220 is λs and the thermal conductivity of the light source support substrate 230 is λl, they are preferably selected to satisfy λs≦λl. This facilitates the transfer of the heat generated by the laser diode 40, through the light source support substrate 230 to the outside while minimizing the transfer of the heat to the slider substrate 220.

The sizes of the slider 22 and the light source unit 23 are arbitrary, but the slider 22 may be, for example, a so-called femtoslider having the width of 700 μm in the track width direction×length (depth) of 850 μm×thickness of 230 μm. In this case, the light source unit 23 can have the width and length approximately equal to them. In fact, for example, the typical size of the ordinary laser diode is approximately the width of 250 μm×length (depth) of 350 μm×thickness of 65 μm, and the laser diode 40 of this size can be adequately mounted, for example, on the side surface of the light source support substrate 230 of this size. It is also possible to make a groove in the bottom surface of the light source support substrate 230 and locate the laser diode 40 in this groove.

The spot of the far field pattern of the laser light reaching the light entrance face 354 of the core 35 can be made in the size in the track width direction, for example, of about 0.5-1.0 μm and the size perpendicular to the foregoing size, for example, of about 1-5 μm. In correspondence thereto, the thickness T35 of the core 35 receiving this laser light is preferably, for example, about 2-10 μm so as to be larger than the spot and the width (W35) in the track width direction of the core 35 is preferably, for example, about 1-200 μm.

The electromagnetic coil element 34 may be one for longitudinal magnetic recording. In this case, a lower magnetic pole layer and an upper magnetic pole layer are provided instead of the main magnetic pole layer 340 and the auxiliary magnetic pole layer 344, and a writing gap layer is interposed between the ends on the medium-facing surface S side of the lower magnetic pole layer and the upper magnetic pole layer. Writing is implemented by a leakage magnetic field from the position of this writing gap layer.

The near-field light generator can also be implemented by a so-called "bow tie type" structure in which a pair of plates of a triangular shape or a trapezoidal shape are opposed to each other with their vertices or shorter sides being spaced by a predetermined distance.

Figure 16:
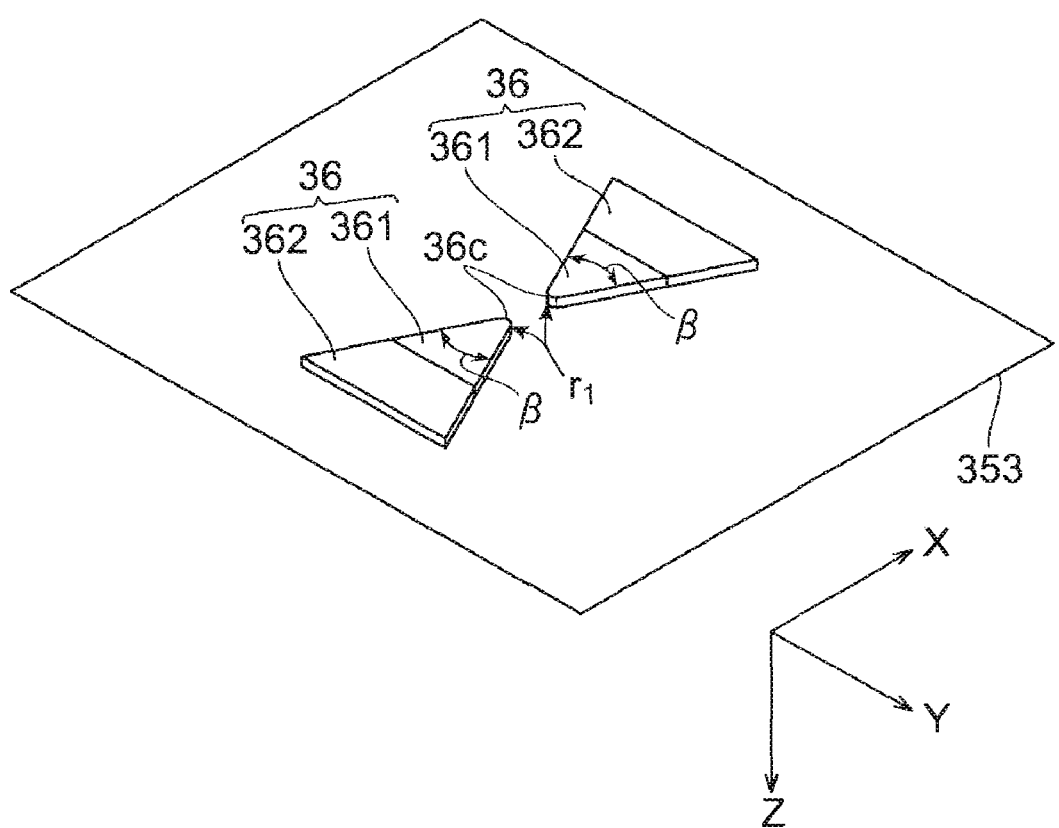
FIG. 16 is a perspective view of near-field generators 36 of "bow tie type" structure.

FIG. 16 is a perspective view of near-field light generators 36 of the "bow tie type" structure. A pair of near-field light generators 36 are arranged opposite to each other along the X-axis and their tips 361c are opposed to each other with a predetermined spacing in between. In this case, each of the near-field light generators 36 is also composed of the cusp portion 361 and the base portion 362 and the materials forming the cusp portions 361 and the base portions 362 are also selected so that, when λin is the wavelength of the emitted light from the laser diode 40 immediately before it reaches the near-field light generator 36, the intensity of the near-field light generated when the material forming the cusp portions 361 is irradiated with the light of the wavelength λin becomes stronger than the intensity of the near-field light generated when the material forming the base portions is irradiated with the light of the wavelength λin. In this "bow tie type" structure, a very strong electric field is concentrated in the central region between the tips 361c to generate near-field light.

It is also possible to adopt a configuration without the light source support substrate 230. A specific example of that case is shown in FIG. 17.

Figure 17:
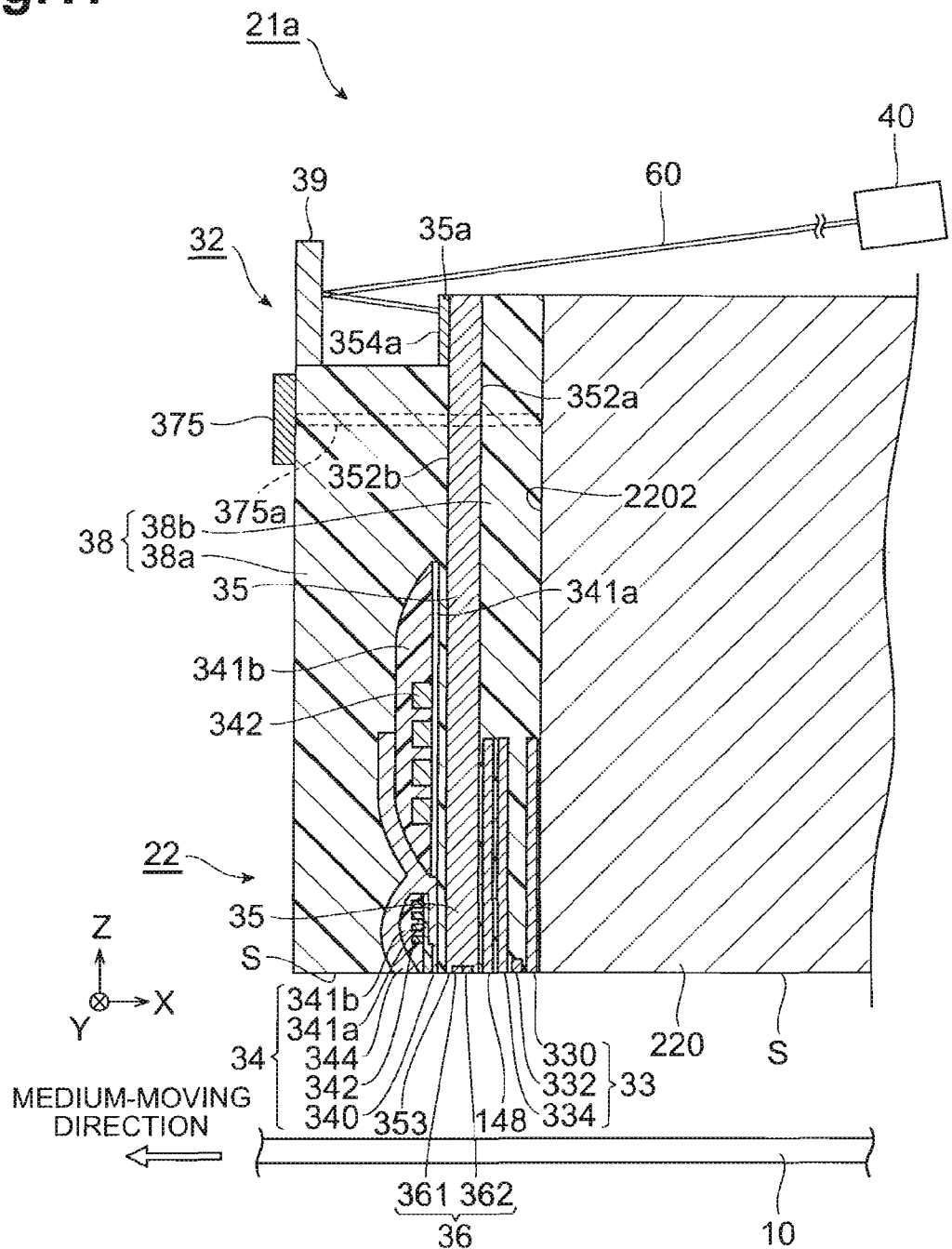
FIG. 17 is a sectional view of a magnetic head according to a modification of the embodiment.

FIG. 17 is a sectional view of a magnetic head according to a modification example of the aforementioned embodiment and corresponds to FIG. 4 in the aforementioned embodiment. This magnetic head 21a is not provided with the light source support substrate 230, different from that in the aforementioned embodiment. Among the insulating layers (claddings) 38 provided on both sides in the X-direction of core 35, the Z-directional height of the one 38a located in the −X-direction with respect to the core 35 is lower than in the aforementioned embodiment. A diffraction grating portion 35a is provided on a side face of the Z-directional end of the core 35. A mirror portion 39 is provided on the upper part of the insulating layer 38a.

In this magnetic head 21a, emitted light 60 from the laser diode 40 travels from the X-direction in the −X-direction in FIG. 17, is reflected by the mirror portion 39, and then is incident to a light entrance face 354a of the diffraction grating portion 35a. The diffraction grating 35a has the effect of bending the light incident to the light entrance face 354a, into the −Z-direction in FIG. 17, whereby the emitted light 60 from the laser diode is guided into the core 35. In this case, the laser diode can be located, for example, on the upper surface of HGA 17, drive arm 14, or pivot bearing shaft 16 in FIG. 1. This configuration can also achieve the effect of the present invention.

It is also possible to adopt a configuration without the core 35, wherein a transparent portion of a transparent material for substantially transmitting the emitted light from the laser diode is provided in the core part in the magnetic head portion 32 and wherein the emitted light is focused by a lens or the like to travel through the transparent portion and irradiate the near-field light generator 36.

The coil layer 342 is one layer in FIG. 4 and others, but it may be two or more layers, or a helical coil.

The heat insulation layer 230a may be formed on the back surface 2201 of the slider substrate 220, and the present invention can also be carried out without the heat insulation layer.

The bonding between the light source unit 23 and the slider 22 can also be implemented with any adhesive other than the UV cure type adhesive, e.g., with a solder layer of AuSn or the like which was used in the bonding between the laser diode 40 and the electrode pad 47.

In the above-described example the linear waveguide was used as the shape of the core 35, but it may also be a parabolic waveguide whose contour in the YZ plane is a parabola, while the near-field light generator is located at the position of its focus. The contour in the YZ plane may also be an elliptical or other shape. The above-described thermally assisted magnetic head and hard disk drive with the HGA are able to adequately prevent the occurrence of writing failure due to the insufficient heating of the recording medium during the writing operation and to adequately prevent the occurrence of "side erase."

It should be noted that the above-described embodiments all were described as illustrative of the present invention but not restrictive of the invention, and that the present invention can also be carried out in a variety of other modification and change forms. Therefore, the scope of the present invention should be defined by the scope of claims and scope of equivalents thereof only.

EXAMPLE

In order to make the effect of the present invention clearer, the present invention will be further described using examples and comparative examples. FIGS. 18 to 23 show the results of simulation of intensity of near-field light emitted from the near-field light generator of the triangular shape, in which intensities of near-field light are indicated by shades. The electric field vector of incident light is set in the X-direction in each drawing.

The materials in each of the examples are as follows.
Example 1 (FIG. 18): Cusp Portion (Ag)/Base Portion (Al)
Example 2 (FIG. 19): Cusp Portion (Au)/Base Portion (Ru)
Comparative Example 1 (FIG. 20): Whole (Ag)
Comparative Example 2 (FIG. 21): Cusp Portion (Ru)/Base Portion (Au)
Comparative Example 3 (FIG. 22): Cusp Portion (Ag)
Example 3 (FIG. 23): Cusp Portion (Au)/Base Portion (Pt)

The dimensions of the near-field light generator in the examples were the length H36 (=90 nm)/maximum width W (=117 nm)/thickness T36 (=30 nm) and the length in the direction H36 of each material was 40 nm for the cusp portion and 50 nm for the base portion. (Reference is made to FIG. 8). Comparative Example 1 was an example in which the entire near-field light generator was made of a single material alone, Comparative Example 2 was an example in which the materials were reverse to those in Example 2, and in either case the entire dimensions were the same as in each example. Comparative Example 3 was an example in which the near-field light generator was comprised of only the cusp portion and the length H36 thereof was 40 nm.

Figure 18:
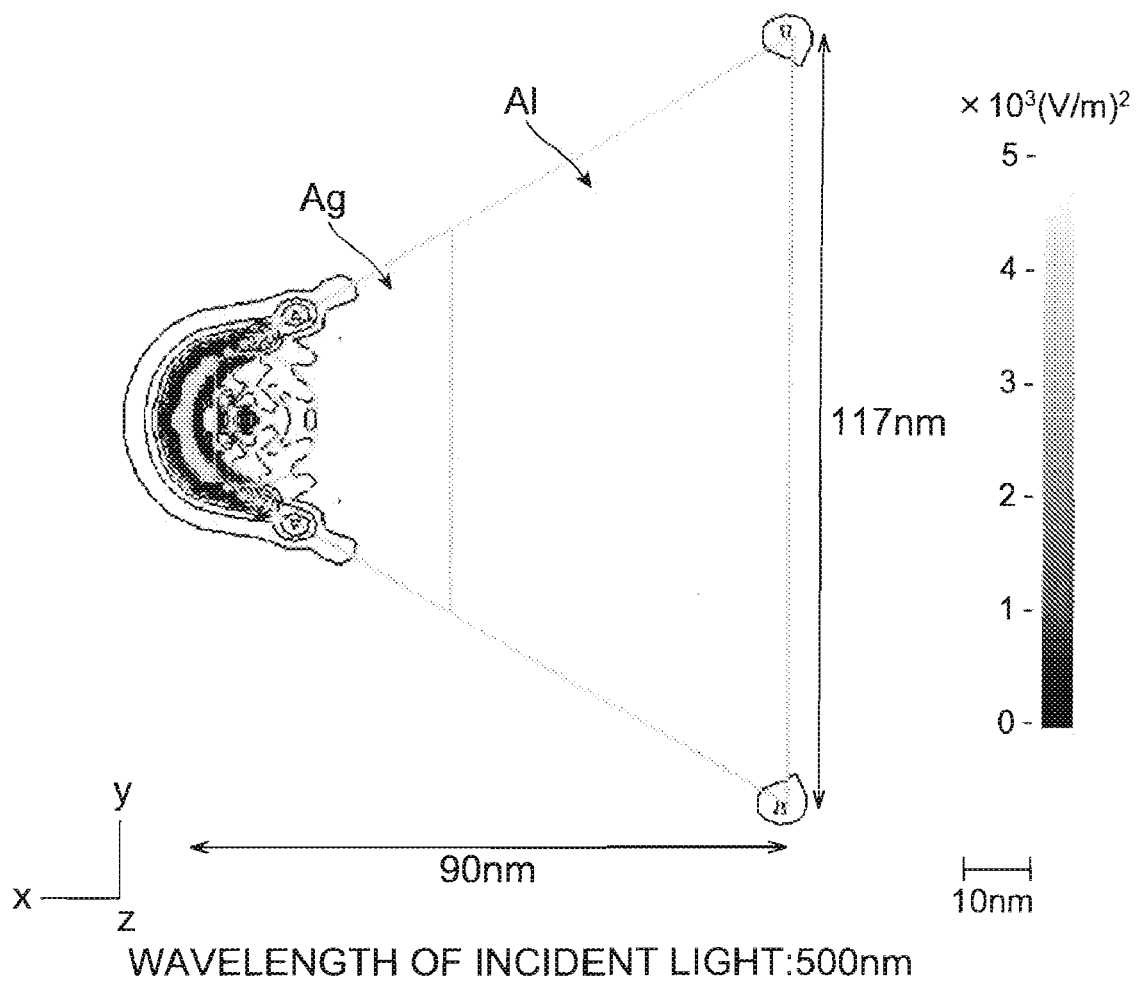
FIG. 18 is a drawing showing the simulation result of intensity of near-field light emitted from the near-field light generator according to an example of the present invention.
Figure 19:
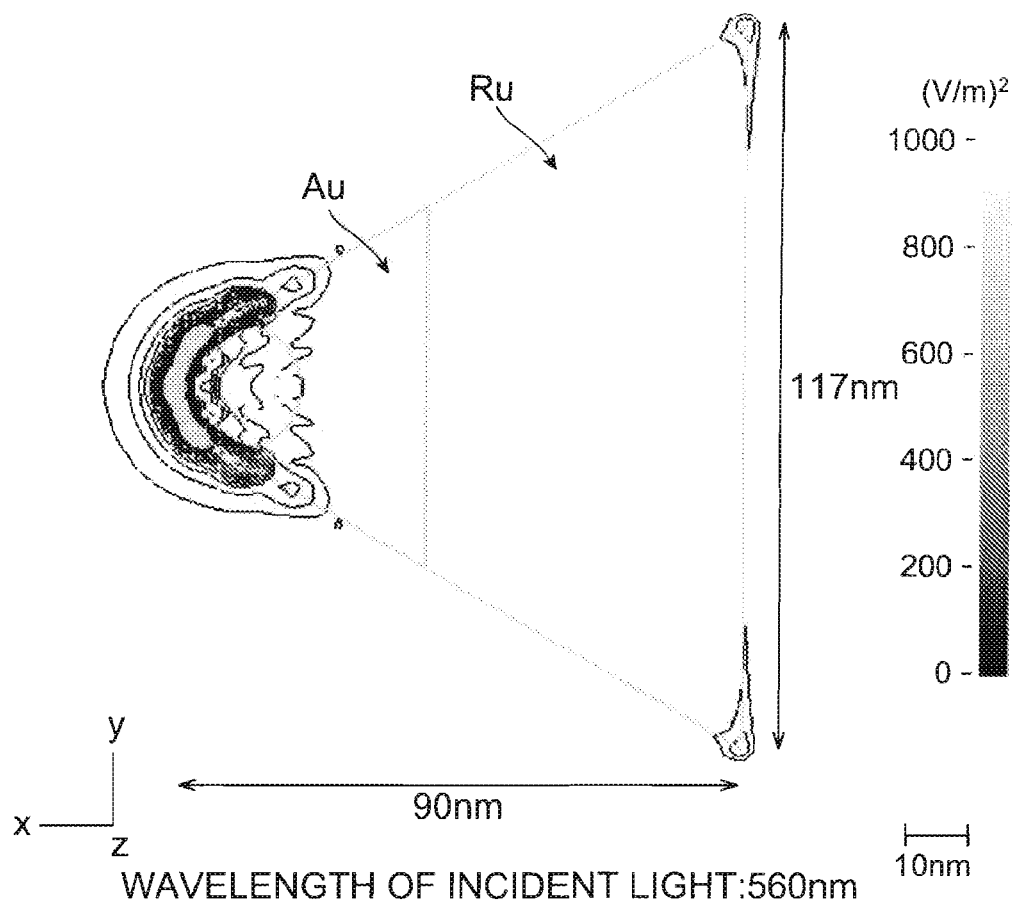
FIG. 19 is a drawing showing the simulation result of intensity of near-field light emitted from the near-field light generator according to an example of the present invention.

FIGS. 18 and 19 are intensity distribution diagrams of near-field light in Example 1 and in Example 2, respectively.

These near-field light generators are comprised of the cusp portion in the X-direction and the base portion in the −X-direction in the drawings, and are made entirely in the same shape. The wavelength of incident light to the near-field light generator was 500 nm in Example 1 and 560 nm in Example 2. In Example 1 (FIG. 18) and Example 2 (FIG. 19), the materials forming the cusp portion and the base portion are selected and combined so that the intensity of the near-field light generated when each of the materials (Ag and Au) forming the cusp portion is irradiated with the incident light becomes stronger than the intensity of the near-field light generated when each of the materials (Al and Ru) forming the base portion is irradiated with the incident light.

Figure 20:
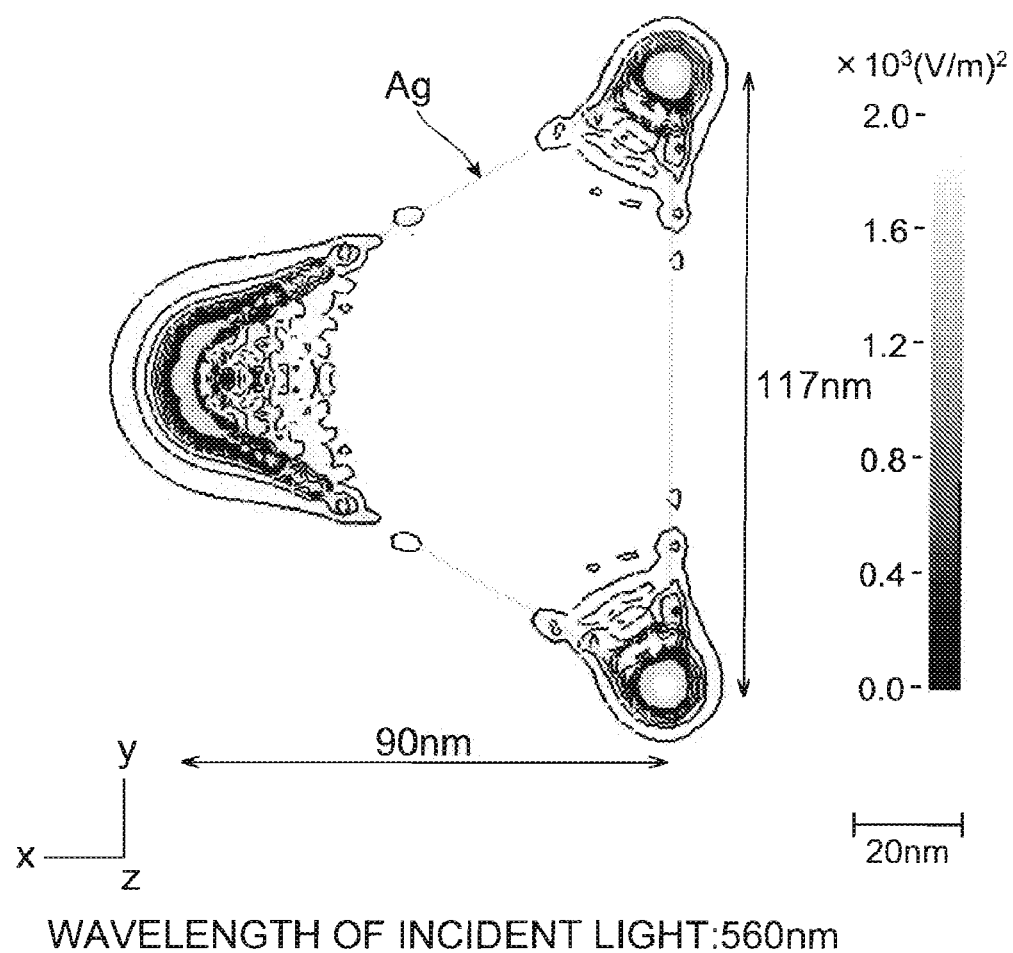
FIG. 20 is a drawing showing the simulation result of intensity of near-field light emitted from the near-field light generator according to a comparative example of the present invention.
Figure 21:
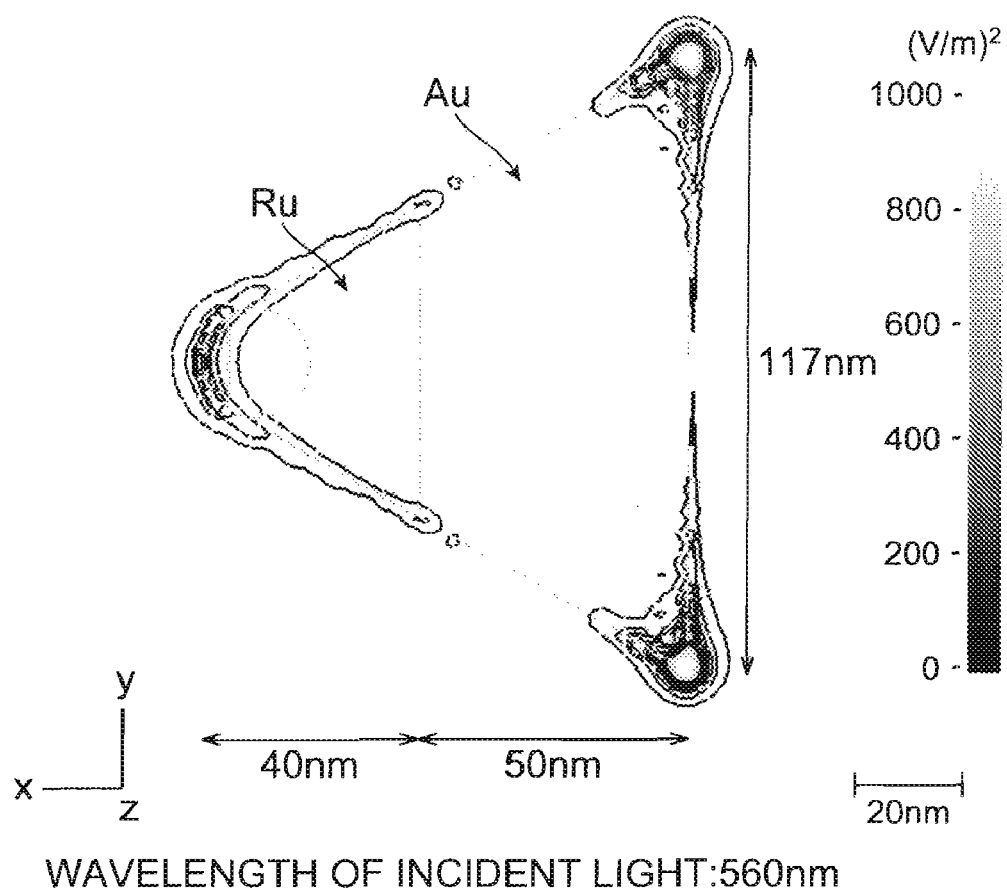
FIG. 21 is a drawing showing the simulation result of intensity of near-field light emitted from the near-field light generator according to a comparative example of the present invention.
Figure 22:
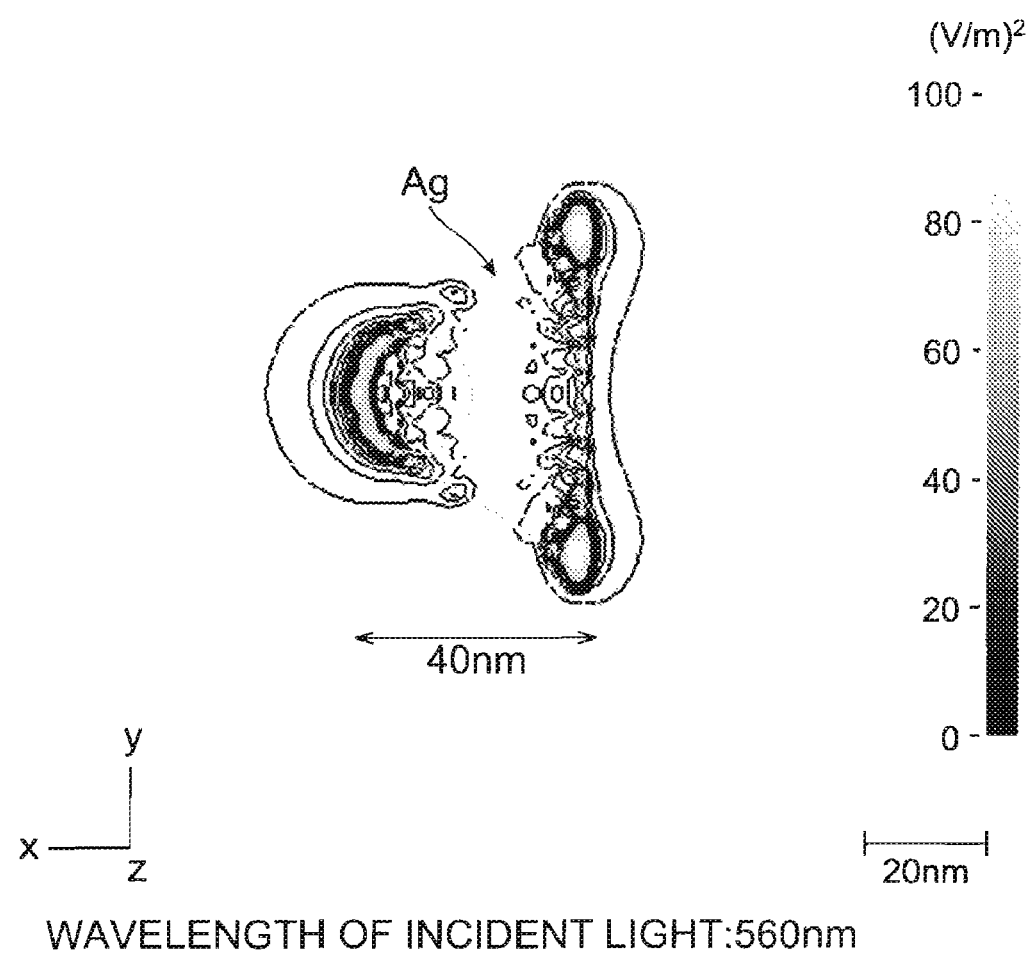
FIG. 22 is a drawing showing the simulation result of intensity of near-field light emitted from the near-field light generator according to a comparative example of the present invention.

FIGS. 20 to 22 are intensity distribution diagrams of near-field light in Comparative Examples 1 to 3, respectively. The wavelength of incident light is 560 nm in all the comparative examples. Comparative Example 1 (FIG. 20) is an example in which the near-field light generator is made of Ag alone and the size thereof is the same as in Examples 1 and 2 (FIGS. 18 and 19). Comparative Example 2 (FIG. 21) is an example in which the materials of the cusp portion and the base portion are replaced with each other as compared with Example 2 (FIG. 19) and the materials of the respective portions are selected and combined so that the intensity of near-field light radiated from the material (Au) forming the base portion becomes stronger than that from the material (Ru) forming the cusp portion, for the incident light of the wavelength of 560 nm. Comparative Example 3 (FIG. 22) is an example in which the near-field light generator is comprised of only the cusp portion, when compared with Example 1 (FIG. 18).

It was found from Example 1 (FIG. 18) and Comparative Example 1 (FIG. 20) that the near-field light generator was better to be comprised of the cusp portion and the base portion as in the case of the near-field light generator according to the present invention, than the near-field light generator was comprised of one kind of metal. Namely, it was confirmed that when the near-field light generator was comprised of the cusp portion and the base portion, the near-field light was intensively radiated from near the tip of the cusp portion and the intensity of the near-field light emitted from near the vertices of the base portion and others became weaker.

It was found from Example 2 (FIG. 19) and Comparative Example 2 (FIG. 21) that the materials forming the cusp portion 361 and the base portion 362 needed to be selected so that the intensity of the near-field light generated when the material forming the cusp portion was irradiated with incident light became stronger than the intensity of the near-field light generated when the material forming the base portion was irradiated with incident light. It was thus confirmed that when the materials of the respective portions were selected in this manner, the near-field light was intensively radiated from near the tip of the cusp portion and the intensity of near-field light emitted from near the vertices of the base portion and others became weaker.

It was found from Example 1 (FIG. 18) and Comparative Example 3 (FIG. 22) that the near-field light generator was better to be comprised of a combination of the cusp portion with the base portion made of the material with weaker intensity of near-field light generated upon irradiation with the incident light, than the near-field light generator was comprised of only the cusp portion made of the material with strong intensity of near-field light generated upon irradiation with the incident light. It was confirmed that when the near-field light generator was formed in this configuration, the near-field light was intensively radiated from near the tip of the cusp portion and the intensity of the near-field light emitted from near the vertices of the base portion and others became weaker.

Figure 23:
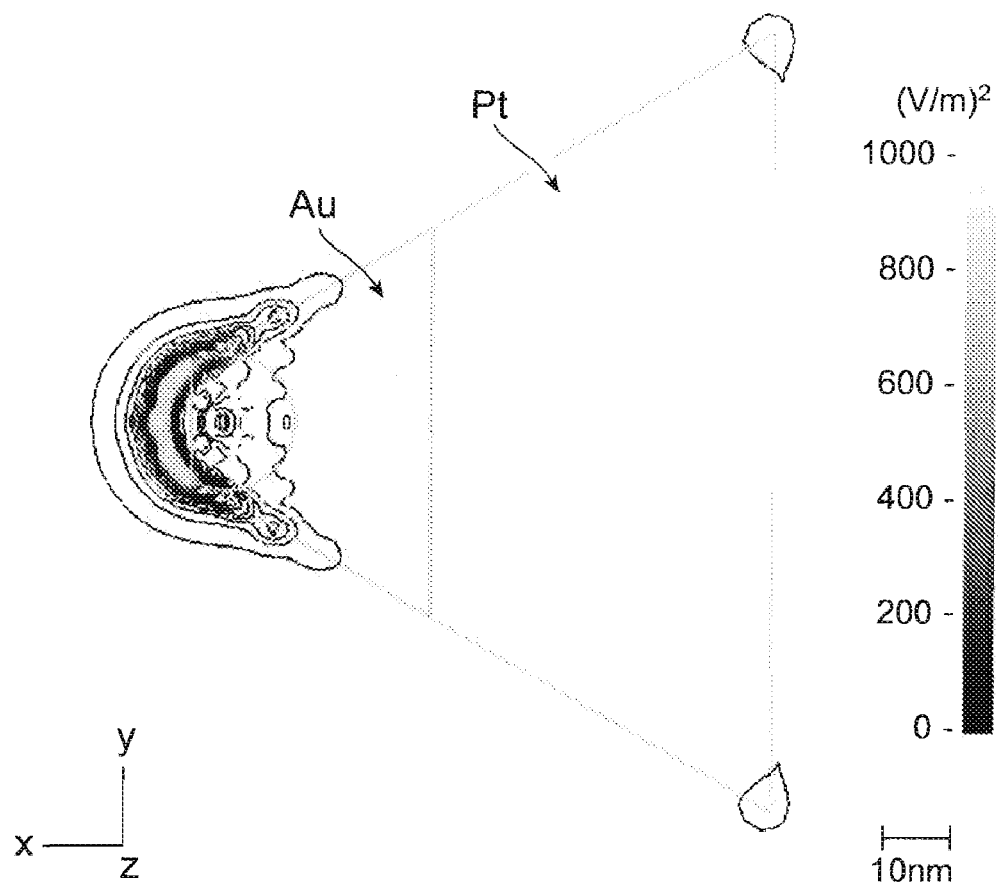
FIG. 23 is a drawing showing the simulation result of intensity of near-field light emitted from the near-field light generator according to an example of the present invention.

FIG. 23 is an intensity distribution diagram of near-field light in Example 3. The wavelength of incident light is 560 nm. The cusp portion and the base portion are made of Au and Pt, respectively. With the combination of these materials, the intensity of near-field light becomes significantly higher at the tip than in the other portions, and emission at the corners of the base portion is also suppressed.

What is claimed is:

1. A thermally assisted magnetic head comprising:
    a medium-facing surface facing a magnetic recording medium;
    a near-field light generator provided on a light exit face in the medium-facing surface;
    a magnetic recording element located adjacent to the near-field light generator;
    a light emitting element provided so that emitted light thereof reaches the near-field light generator; and
    a core of a planar waveguide including the light exit face where the near-field light generator is formed,
    wherein the near-field light generator is a plate-like member that extends along the medium-facing surface and is comprised of a cusp portion formed from a first material (a) and a base portion formed from a second material (b) as viewed from the medium-facing surface,
    wherein the emitted light from the light emitting element is incident to a light entrance face of the planar waveguide,
    wherein when $\lambda$in is a wavelength of the emitted light from the light emitting element immediately before the emitted light reaches the near-field light generator, an intensity of near-field light generated when the first material (a) is irradiated with the light of the wavelength $\lambda$in is larger than an intensity of near-field light generated when the second material (b) is irradiated with the light of the wavelength $\lambda$in,
    wherein when $\lambda$in is 350-420 nm, a combination (a, b) of the material (a) with the material (b) is one selected from the group consisting of the following combinations: (Al, Ag), (Al, Rh), (Al, Ru), and (Al, Pt),
    wherein when $\lambda$in is 500-560 nm, the combination (a, b) of the material (a) with the material (b) is one selected from the group consisting of the following combinations: (Ag, Al), (Ag, Au), (Au, Al), (Au, Ru), (Au, Pt), (Au, In), (Au, Rh), (Ag, In), (Ag, Rh), (Ag, Ru), (Ag, Pt), (Au, Pd), (AuCu, Pt), (AuCu, In), (AuCu, Al), (AuCu, Pd), and (AuCu, Rh), and
    wherein when $\lambda$in is 620-700 nm, the combination (a, b) of the material (a) with the material (b) is one selected from the group consisting of the following combinations: (Au, Ag), (Au, Al) and (Au, Rh).

2. The thermally assisted magnetic head according to claim 1, wherein the cusp portion of the near-field light generator is closer to the magnetic recording element than the base portion of the near-field light generator.

3. The thermally assisted magnetic head according to claim 1, wherein an area of a planar shape of the cusp portion of the near-field light generator as viewed from the medium-facing surface side is smaller than an area of a planar shape of the base portion of the near-field light generator as viewed from the medium-facing surface side.

4. The thermally assisted magnetic head according to claim 1, wherein a planar shape of the base portion of the near-field light generator as viewed from the medium-facing surface side has a corner comprised of a curve.

5. The thermally assisted magnetic head according to claim 1, wherein in a planar shape of the near-field light generator as viewed from the medium-facing surface side, a side of the cusp portion in contact with one end of a border line between the cusp portion and the base portion, and a side of the base portion in contact with the one end of the border line are linearly continuous without any level difference, and
    a side of the cusp portion in contact with the other end of the border line, and a side of the base portion in contact with the other end of the border line are linearly continuous without any level difference.

6. A head gimbal assembly comprising:

the thermally assisted magnetic head as defined in claim 1; and a suspension supporting the thermally assisted magnetic head.

7. A hard disk drive comprising:

the head gimbal assembly as defined in claim 6; and the magnetic recording medium facing the medium-facing surface.

* * * * *